United States Patent
Ando et al.

(10) Patent No.: US 7,958,565 B2
(45) Date of Patent: Jun. 7, 2011

(54) SCAN TYPE PROBE MICROSCOPE AND CANTILEVER DRIVE DEVICE

(75) Inventors: Toshio Ando, Ishikawa (JP); Takayuki Uchihashi, Ishikawa (JP); Noriyuki Kodera, Ishikawa (JP); Hayato Yamashita, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 731 days.

(21) Appl. No.: 11/915,940

(22) PCT Filed: May 26, 2006

(86) PCT No.: PCT/JP2006/310535
§ 371 (c)(1),
(2), (4) Date: Nov. 29, 2007

(87) PCT Pub. No.: WO2006/129561
PCT Pub. Date: Dec. 7, 2006

(65) Prior Publication Data
US 2009/0313729 A1    Dec. 17, 2009

(30) Foreign Application Priority Data
May 31, 2005 (JP) ................................ 2005-159910

(51) Int. Cl.
*G01B 5/28* (2006.01)
(52) U.S. Cl. ................. 850/33; 850/36; 850/38; 850/50
(58) Field of Classification Search .................... 850/33, 850/36, 38, 50; 250/306, 307; 73/105
See application file for complete search history.

(56) References Cited

U.S. PATENT DOCUMENTS 6,189,374 B1* 2/2001 Adderton et al. ............... 73/105
6,330,824 B1* 12/2001 Erie et al. ........................ 73/105
(Continued)

FOREIGN PATENT DOCUMENTS
JP     07-159465     6/1995
(Continued)

OTHER PUBLICATIONS

J. Mertz, et al., Regulation of a Microcantilever Response by Force Feedback, appl. Phys. Lett. vol. 62, No. 19, 1993, p. 2344-2346.
International Search Report Dated Aug. 29, 2006.

*Primary Examiner* — Robert Kim
*Assistant Examiner* — Michael Maskell
(74) *Attorney, Agent, or Firm* — Pearne & Gordon LLP

(57) ABSTRACT

A driving laser unit (11) irradiates a laser beam on a cantilever (5) to cause thermal expansion deformation. A driving-laser control unit (13) performs feedback control for the cantilever (5) by controlling intensity of the laser beam on the basis of displacement of the cantilever (5) detected by a sensor (9). A thermal-response compensating circuit (35) has a constitution equivalent to an inverse transfer function of a heat transfer function of the cantilever (5) and compensates for a delay in a thermal response of the cantilever (5) to the light irradiation. Moreover, the cantilever (5) may be excited by controlling the intensity of the laser beam. By controlling light intensity, a Q value of a lever resonance system is also controlled. It is possible to increase scanning speed of an atomic force microscope.

25 Claims, 18 Drawing Sheets

U.S. PATENT DOCUMENTS

| | | | |
|---|---|---|---|
| 2004/0093935 A1* | 5/2004 | Yamaoka et al. | 73/105 |
| 2004/0256552 A1* | 12/2004 | Kawakatsu | 250/306 |
| 2006/0051884 A1* | 3/2006 | McNamara et al. | 438/14 |
| 2006/0162455 A1* | 7/2006 | Kawakatsu | 73/579 |
| 2006/0261264 A1* | 11/2006 | Warren et al. | 250/234 |
| 2009/0320167 A1* | 12/2009 | Kobayashi et al. | 850/40 |

FOREIGN PATENT DOCUMENTS

| | | |
|---|---|---|
| JP | 11-512830 | 11/1999 |
| JP | 2001-228074 | 8/2001 |
| JP | 2002-540436 | 11/2002 |
| JP | 2004-212078 | 7/2004 |

* cited by examiner

LENGTH: ABOUT 8 μM

WIDTH: ABOUT 2 μM

THICKNESS: ABOUT 0.1 μM (INCLUDING GOLD COAT)

RESONANCE FREQUENCY: 800 kHz (IN LIQUID)
                                2.2 MHz (IN ATMOSPHERE)

SPRING CONSTANT: 150pN/nm (WITHOUT THERMAL RESPONSE COMPENSATION)

(WITH THERMAL RESPONSE COMPENSATION)

SCAN TYPE PROBE MICROSCOPE AND CANTILEVER DRIVE DEVICE

TECHNICAL FIELD

The present invention relates to a scanning probe including a cantilever and a driving device for the cantilever.

BACKGROUND ART

Conventionally, a scanning tunnel microscope (STM) and an atomic force microscope (AFM) are known as typical scanning probe microscopes (SPMs). The AFM includes a cantilever that has a probe at a free end thereof, a sensor that detects displacement of the cantilever, and a sample stage scanner. The sensor is typically a sensor of an optical lever type. The sample stage scanner typically includes a piezoelectric element and moves a sample in X, Y, and Z directions with respect to the cantilever.

In the AFM, the sample and the cantilever are scanned in the X and Y directions relatively to each other. In this case, displacement in the Z direction is feedback-controlled such that force acting on the cantilever and the sample is kept constant. The feedback control of the displacement in the Z direction is called Z scanning. It is possible to obtain a fine shape of a sample surface from the movement of the sample stage for keeping the force acting on the cantilever and the sample constant.

As measurement modes of the AFM, typically, an AC mode and a contact mode are known. In the AC mode, the cantilever is excited at a resonance frequency. Amplitude changes when the cantilever approaches the sample. Thus, the feedback control in the Z direction is performed such that the amplitude is fixed. Consequently, a distance between the cantilever and the sample is kept constant.

<Scanning Speed of the AFM>

In the conventional AFM, measurement is slow and time in the order of minute is required to pick up one image. This is because the feedback scanning is slow. The feedback scanning is to move the sample stage up and down to adjust a distance between the probe and the sample surface and keep the force acting on the cantilever probe and the sample constant. Since a long time is required to acquire an image, for example, it is difficult to observe movement of the sample.

Most of devices of the AFM are involved in a loop of the feedback scanning. The devices involved are the cantilever, the sensor, a sensor amplifier, a control circuit, a piezoelectric drive power supply, a sample stage scanner, and the like. Among these devices, usually, the sample stage scanner is a slowest device. Therefore, an increase in speed of the scanner is essential to increase imaging speed of the AFM.

However, in the conventional AFM, a limit of the increase in speed of the scanner is low. More specifically, in the conventional AFM, the scanner includes a piezoelectric element having a macro size. The sample stage is scanned in the three-dimensional directions of X, Y, and Z by the scanner. The feedback scanning is Z direction scanning and higher in speed compared with XY direction scanning. This Z direction scanning needs to be performed in a domain lower than a resonance frequency of the piezoelectric element. Therefore, in order to increase the scanning speed, it is necessary to increase the resonance frequency of the piezoelectric element in the Z direction scanning. However, since the piezoelectric element has a macroscopic size compared with the cantilever and the like, the resonance frequency of the piezoelectric element is low. This is a factor that prevents the increase in speed of the scanner.

In the feedback scanning, the cantilever may be moved in the Z direction instead of moving the sample stage in the Z direction. Thus, by introducing a piezoelectric thin film into the cantilever using the MEMS technology, a cantilever having a self-actuation function is developed. In this case, since the cantilever is extremely small compared with the sample stage scanner, it is possible to easily increase the resonance frequency. Therefore, it is easy to increase speed of the feedback scanning. However, since the cantilever has the self-actuation function, a structure of the cantilever is complicated and the cantilever is extremely hard. Therefore, The cantilever of the self-actuation type has a limit in that it is difficult to use the cantilever in measurement of fragile and soft samples such as biopolymer and synthetic polymer.

<Q Value Control for the Cantilever>

Incidentally, the cantilever is a sort of resonance system. As an amount representing sharpness of a resonance spectrum (a relation of displacement of the cantilever with respect to a frequency of an excitation force), there is a Q value (a Quality factor). As viscous resistance acting on the resonance system is smaller, the Q value is larger. Conversely, as the viscous resistance is larger, the Q value is smaller.

Response speed of the resonance system is represented by πf/Q. Here, f is a resonance frequency. As the Q value is larger, the response speed is lower. On the other hand, displacement sensitivity of the resonance system to an external force is higher as the Q value is larger.

Q-value control for artificially changing the Q value of the cantilever has already been proposed. The principle of the Q-value control is as described below. An equation of motion of the resonance system is described below.

[Numeral 1]

$$m\ddot{x}+\gamma\dot{x}+kx=F(t)$$

Displacement "x" is detected, the displacement x is subjected to time differentiation, and the time differentiation is multiplied by a coefficient "α" This value is added to or subtracted from an excitation force F(t) to obtain the following equation.

[Numeral 2]

$$m\ddot{x}+\gamma\dot{x}+kx=F(t)\pm a\dot{x}$$

In the case of addition (+), the viscous resistance decreases. As a result, the Q value increases. In the case of subtraction (−), the viscous resistance increases and the Q value decreases. In this way, it is possible to arbitrarily increase or decrease the Q value. Consequently, it is possible to adjust the response speed and the displacement sensitivity.

The Q-value control for the cantilever is control for applying an external force to the cantilever as indicated by the above equation. It is conceivable to apply the external force to the cantilever via some medium. However, since a delay in a phase occurs, even though the phase should be changed by degrees by the time differentiation, the phase is not precisely 90 degrees. Therefore, the control is not easy. When the external force is applied via a medium, mechanical elements around the cantilever also have resonance frequencies. This makes it difficult to accurately adjust a frequency of the external force to the resonance frequency of the cantilever.

Considering such matters, in the Q-value control, it is desired to directly apply the external force to the cantilever. Thus, conventionally, a ferromagnetic body is attached to the cantilever. Alternatively, the cantilever is coated with a ferromagnetic thin film. The external force is applied to the cantilever by an electromagnet. In the cantilever having the self-actuation function, it is also possible to directly apply the external force to the cantilever. However, in such a constitution, special work for the cantilever is necessary and mechanical characteristics (the resonance frequency and a spring constant) of the cantilever change.

A related art is disclosed in JP-A-2004-212078. In this related art, a laser beam is irradiated on a cantilever and the cantilever is excited by the laser beam.

DISCLOSURE OF THE INVENTION

Problems that the Invention is to Solve

As described above, in the conventional AFM, the scanning speed in the Z direction is low and, therefore, the measurement speed is low. In the conventional AFM, there is a room of improvement in the Q-value control.

The invention has been devised in view of the background described above. An object of the invention is to provide a scanning probe microscope that can improve scanning speed.

Another object of the invention is to provide a scanning probe microscope that can suitably perform Q-value control.

Means for Solving the Problems

A scanning probe microscope of the invention includes a cantilever, a sensor that detects displacement of the cantilever, a light irradiating unit that irradiates light on the cantilever to cause thermal expansion deformation, and a light-irradiation control unit that controls intensity of the light of the light irradiating unit to change the displacement of the cantilever. The light-irradiation control unit performs feedback control for the cantilever by controlling the intensity of the light of the light irradiating unit on the basis of the displacement detected by the sensor.

According to this constitution, light is irradiated on the cantilever and the cantilever is displaced by thermal expansion deformation. Scanning in the Z direction is performed utilizing this displacement. The cantilever is extremely small and has a high resonance frequency. Therefore, a resonance frequency of a constitution of the Z scanning is high and it is possible to increase the scanning speed. It is possible to prevent the cantilever from becoming hard as observed in the conventional cantilever of the self-actuation type.

The light-irradiation control unit may include a thermal-response compensating unit that compensates for a delay in a thermal response of the cantilever to the irradiation of the light from the light irradiating unit. The thermal-response compensating unit may have a constitution equivalent to an inverse transfer function of a heat transfer function of the cantilever (which means a function that is an inverse of a heat transfer function; the same applies in the following description). It is possible to eliminate a slow process of a heat conduction process (or substantially reduce the process) in appearance according to the thermal response compensation. An element that connects the light irradiation, which is an input, and the displacement, which is an output, has characteristics close to the original mechanical characteristics of the cantilever. Since response speed of deformation by thermal expansion is high, it is possible to perform high-speed scanning and high-speed imaging.

The light-irradiation control unit may further oscillate the cantilever by controlling intensity of the light of the light irradiating unit. The intensity of the light may be controlled to vary in an oscillation waveform corresponding to oscillation of the cantilever that should be generated (typically, an oscillation waveform corresponding to the resonance frequency of the cantilever). Both the excitation and the Z scanning of the cantilever are performed by the light irradiation. Therefore, it is possible to simplify a structure of the scanning probe microscope.

The light-irradiation control unit may further include a Q-value control unit that performs the Q-value control on the basis of the displacement detected by the sensor. The Q-value control unit may have a constitution for obtaining a value that a gain is given to differential of the displacement detected by the sensor (the gain is equivalent to a coefficient by which the differential of displacement is multiplied in the Q-value control). According to this constitution, it is possible to perform the Q-value control utilizing the light irradiation.

In another aspect of the invention, a scanning probe microscope includes a cantilever, a light irradiating unit that irradiates light on the cantilever to cause thermal expansion deformation, and a light-irradiation control unit that controls intensity of the light of the light irradiating unit to change displacement of the cantilever. The light-irradiation control unit includes an oscillation control unit that oscillates the cantilever by controlling intensity of the light of the light irradiating unit and a thermal-response compensating unit that compensates for a delay in a thermal response of the cantilever to the irradiation of the light from the light irradiating unit.

In this aspect, the light irradiation is used for oscillation of the cantilever. This aspect includes a constitution for applying the light irradiation to the Z scanning and a constitution for not applying the light irradiation to the Z scanning. In this aspect, as in the aspect described above, it is possible to eliminate a heat conduction process (or substantially reduce the process) in appearance according to the thermal response compensation. Since the mechanical characteristics of the cantilever remain, it is possible to suitably control oscillation. In this aspect, as in the aspect described above, the Q-value control may be suitably performed on the basis of the displacement of the cantilever. Moreover, it is possible to apply the other various characteristics of the invention to this aspect as well. In this aspect, as in the aspect described above, the advantages of the invention are obtained.

Still another aspect of the invention is an observation method by a scanning probe microscope. This method includes performing relative movement between a cantilever and a sample in X and Y directions, irradiating light on the cantilever to cause thermal expansion deformation, detecting displacement of the cantilever, and performing feedback control for the cantilever by controlling intensity of the light on the basis of the displacement of the cantilever detected. The control of the intensity of the light may compensate for a delay in a thermal response of the cantilever to the irradiation of the light. The control of the intensity of the light may be utilized for oscillation of the cantilever. By controlling the intensity of the light, Q-value control based on the displacement of the cantilever may be performed. Moreover, it is possible to apply the other various characteristics of the invention to this aspect as well. In this aspect, as in the aspects described above, the advantages of the invention are obtained.

A still another aspect of the invention is an observation method by a scanning probe microscope. This method includes performing relative movement a cantilever and a sample in X and Y directions, irradiating light on the cantilever to cause thermal expansion deformation, oscillating the cantilever by controlling intensity of the light, and compensating for a delay in a thermal response of the cantilever to the irradiation of the light by controlling intensity of the light. By controlling the intensity of the light, Q-value control based on displacement of the cantilever may be performed. Moreover, it is possible to apply the other various characteristics of the invention to this aspect as well. In this aspect, as in the aspects described above, the advantages of the invention are obtained.

Within the scope of the invention, representations of the invention are not limited to the scanning probe microscopes and the observation methods in which the scanning probe microscopes are used as described above. Still another aspect of the invention may be an atomic force microscope and an observation method in which the atomic force microscope is used. Still another aspect of the invention may be a driving device or a driving method for a scanning probe microscope or an atomic force microscope. Still another aspect of the invention may be a cantilever driving device or a cantilever driving method. Moreover, still another aspect of the invention may be a control device or a control method for the devices described above. These aspects may include a constitution for driving the cantilever described above. It is possible to apply the other various characteristics of the invention to these aspects as well. In these aspects, as in the aspects described above, the advantages of the invention are obtained.

According to the invention described above, it is possible to improve scanning speed by successfully utilizing light irradiation and it is possible to facilitate the Q-value control.

As explained below, there are other aspects in the invention. Therefore, the disclosure of the invention is intended to provide a part of the aspects of the invention and is not intended to limit the scope of the invention described and claimed herein.

A detailed explanation of the invention will be hereinafter described. However, the detailed explanation and the accompanying drawings do not limit the invention. Instead, the scope of the invention is limited by claims attached hereto.

In an embodiment of the invention, the invention is applied to an atomic force microscope (AFM).

Figure 1:
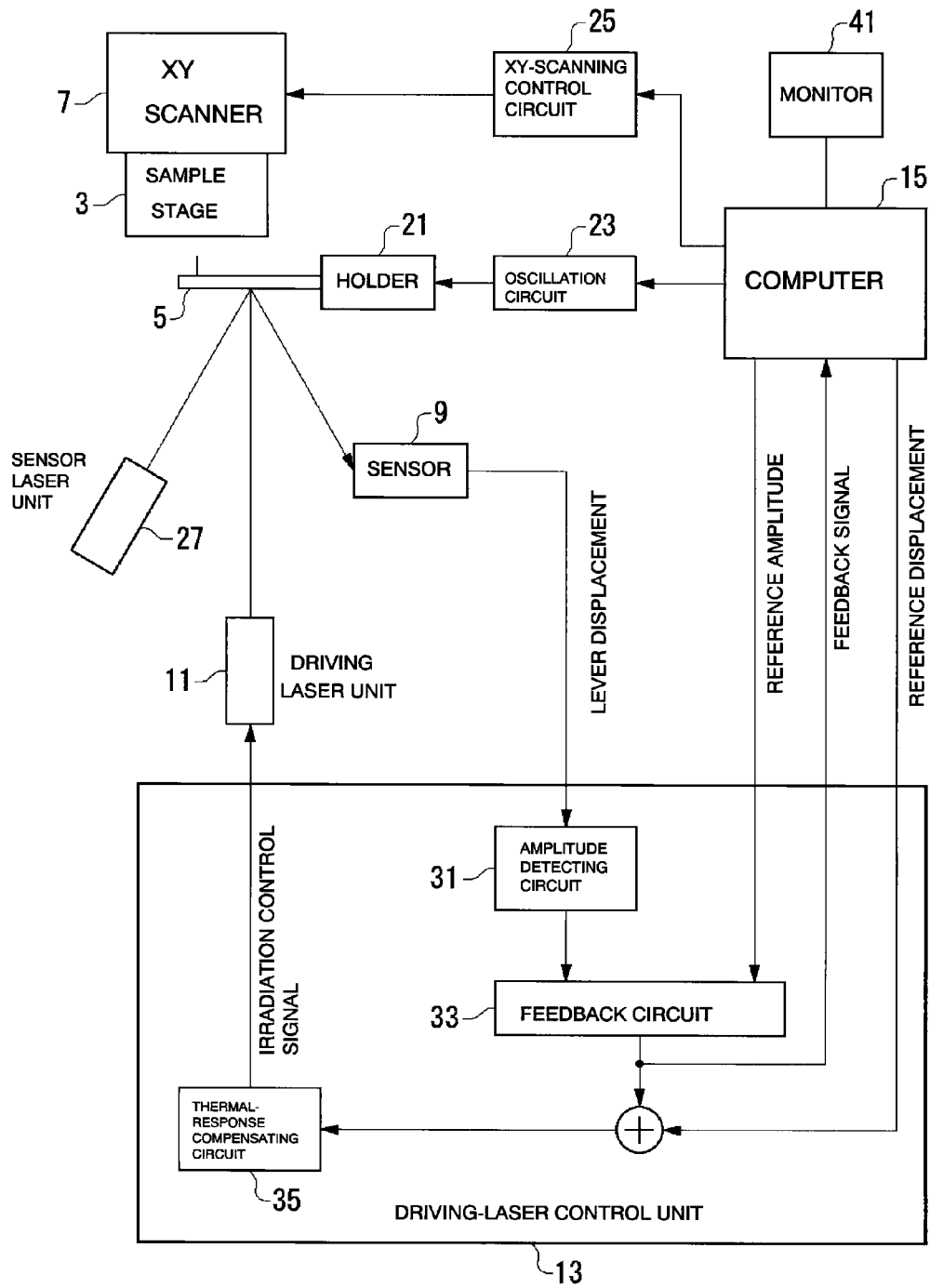
FIG. 1 is a diagram showing a structure of an AFM according to an embodiment of the invention.

FIG. 1 shows a structure of the AFM according to this embodiment. An AFM 1 includes, as an overall structure, a sample stage 3 that holds a sample, a cantilever 5, an XY scanner 7 that drives the sample stage 3 in X and Y directions, a sensor 9 that detects displacement of the cantilever 5, a driving laser unit 11 that irradiates light on the cantilever 5, a driving-laser control unit 13 that controls the driving laser unit 11, and a computer 15 that controls the entire device.

The cantilever 5 is made of silicon nitride and has a probe at a free end thereof. Gold is coated on a light irradiation surface (a lower side in the figure) of the cantilever 5. A sensor laser beam for displacement detection and a driving laser beam for lever driving are irradiated on the light irradiation surface.

The cantilever 5 is held by a holder 21. The holder 21 is excited by an oscillation circuit 23. An oscillator of the holder 21 oscillates in response to an oscillation signal supplied from the oscillation circuit 23, whereby the cantilever 5 oscillates. The oscillation circuit 23 is controlled by the computer 15 such that the cantilever 5 oscillates near a resonance frequency.

The XY scanner 7 includes a piezoelectric element. The XY scanner 7 is controlled by an XY-scanning control circuit 25. A control signal for XY scanning (raster scanning) is inputted to the XY-canning control circuit 25 from the computer 15. The XY-scanning control circuit 25 drives the XY scanner 7 in accordance with a control signal. Consequently, the sample stage 3 moves in the X and Y directions and scanning in the X and Y directions is realized.

The sensor 9 constitutes a displacement sensor of an optical lever type together with a sensor laser unit 27. The sensor laser unit 27 irradiates a sensor laser beam on the cantilever 5. The sensor laser beam is a red laser beam (having a wavelength of 670 nm). The sensor laser beam reflects on the gold coated surface of the cantilever 5 and reaches the sensor 9. The sensor 9 includes a photodiode and outputs a signal representing displacement of the cantilever 5. In the figure, a structure of an optical system such as a lens related to the sensor is not shown.

Figure 2:
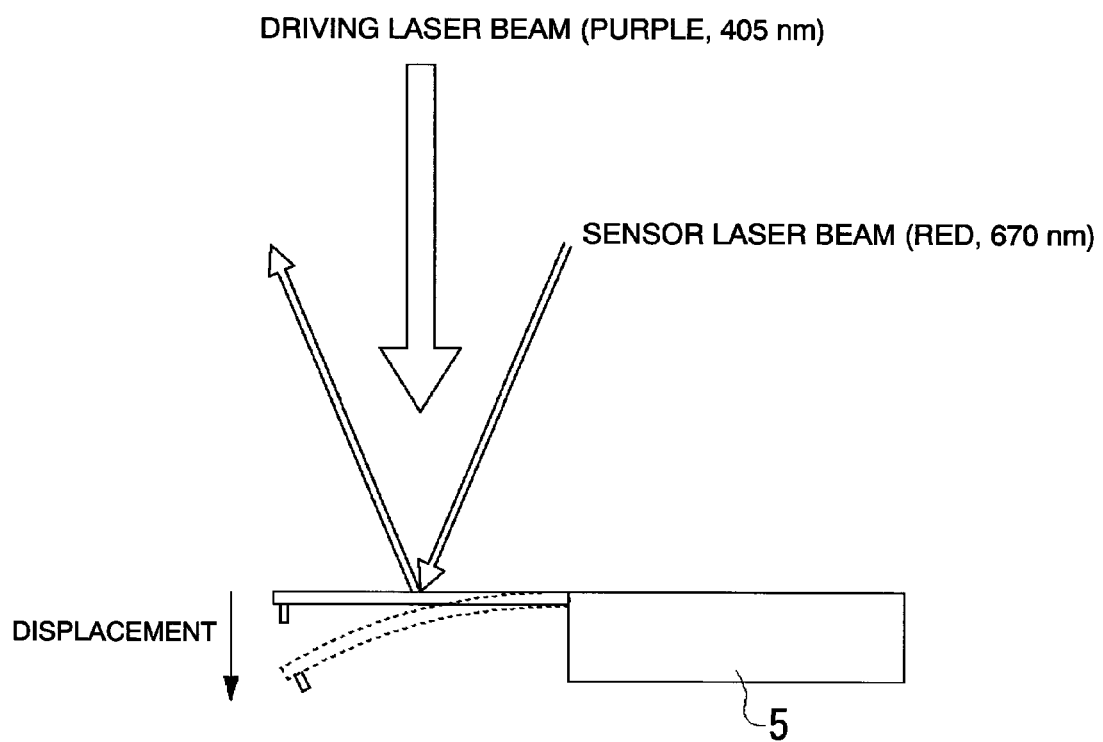
FIG. 2 is a diagram showing deformation of a cantilever due to light irradiation.

The driving laser unit 11 irradiates a driving laser beam on the cantilever 5. In this embodiment, the driving laser beam is a visible light laser. A wavelength of the driving laser beam is set to a value with which a light absorption ability of the gold coat is improved. Specifically, the driving laser beam is a purple laser beam and has a wavelength of 405 nm. When the driving laser beam is irradiated, thermal expansion occurs in the cantilever 5. Since coefficients of thermal expansion are different in the silicon nitride forming the cantilever 5 and the gold coat, the cantilever 5 plays a function of bimetal. As shown in FIG. 2, deflection or bending deformation of the cantilever 5 occurs. Consequently, displacement in the Z direction of the cantilever 5 is obtained. In the figure, a structure of an optical system such as a lens related to the driving laser is not shown.

The driving laser unit 11 is controlled by the driving-laser control unit 13. The driving-laser control unit 13 controls the driving laser unit 11 by supplying an irradiation control signal to the driving laser unit 11. The irradiation control signal is a modulation input signal. The driving laser unit 11 applies intensity modulation to a laser in response to the modulation input signal. Modulation intensity is used for control of displacement of the cantilever 5. An amount of deformation of the cantilever 5 changes according to laser beam intensity and displacement in the Z direction changes.

In this embodiment, the driving-laser control unit 13 controls displacement of the cantilever 5 by controlling modulation intensity of the driving laser beam. Consequently, the driving-laser control unit 13 functions as a Z-scanning control unit as described below.

Signals of reference displacement and reference amplitude are inputted to the driving-laser control unit 13 from the computer 15. The reference displacement is initial displacement of the cantilever 5 and can be referred to as offset displacement. The reference amplitude is amplitude of the cantilever 5 that is a target of feedback control. Displacement of the cantilever 5 is also inputted to the driving-laser control unit 13 from the sensor 9. The driving laser control unit 13 controls laser beam intensity in accordance with the reference displacement and performs feedback control for the laser beam intensity on the basis of the reference amplitude and the lever displacement such that the lever amplitude coincides with the reference amplitude. Consequently, amplitude of the cantilever 5 is kept constant.

For the feedback control, the driving-laser control unit includes an amplitude detecting circuit 31 and a feedback circuit 33. The amplitude detecting circuit 31 processes a signal of displacement of the cantilever 5 inputted from the sensor 9 and determines amplitude of the cantilever 5. The amplitude detecting circuit 31 outputs the signal of amplitude detected to the feedback circuit 33.

The feedback circuit 33 includes a subtracter that subtracts a detected amplitude signal from a reference amplitude signal to generate a deviation signal and a PID circuit that amplifies the deviation signal. A feedback signal is generated by these structures.

The feedback signal is added to a signal of the reference displacement inputted from the computer 15. An irradiation control signal obtained in this way is supplied to a thermal-response compensating circuit 35. The thermal-response compensating circuit 35 is a circuit that compensates for a delay in a thermal response of the cantilever 5 to light irradiation. The thermal-response compensating circuit 35 will be described later.

The irradiation control signal having passed through the thermal-response compensating circuit 35 is supplied to the driving laser unit 11. The intensity of the driving laser beam varies in accordance with this irradiation control signal and the displacement of the cantilever 5 varies. The irradiation control signal is formed of a feedback control signal obtained by processing a signal of amplitude obtained on the basis of the lever displacement. Thus, the laser beam intensity varies in response to the feedback signal and the displacement in the Z direction of the cantilever 5 also varies in response to the feedback signal. In this way, the feedback control for the cantilever 5 is realized.

The computer 15 controls the entire AFM 1. The computer 15 also provides a user interface function. When various instructions of a user are inputted to the computer 15, the computer 15 controls the AFM 1 in accordance with the input by the user. A feedback signal is inputted to the computer 15 from the feedback circuit 33 of the driving-laser control unit 13. The computer 15 generates a three-dimensional image of a sample surface on the basis of control data of XY scanning and the feedback signal inputted and displays the three-dimensional image on a monitor 41.

The structures of the respective units of the AFM 1 have been explained. The structures may be modified as long as the same functions are obtained. For example, the driving-laser control unit 13 may be built in the computer 15. Software may be used to realize the function of the driving-laser control unit 13. Data processed in the computer 15 may correspond to the above signals.

An overall operation of the AFM 1 will be explained. The computer 15 sends a control signal for the XY scanning to the XY-scanning control circuit 25 and drives the sample stage 3 in the X and Y directions. The computer 15 causes the oscillation circuit 23 to generate an oscillation signal to oscillate the cantilever 5 together with the holder 21. Moreover, the computer 15 supplies signals of the reference displacement and the reference amplitude to the driving-laser control unit 13. The driving-laser control unit 13 functions as described above and performs the feedback control for the cantilever 5 to deform the cantilever 5 in the Z direction to the reference displacement.

In this way, in a state in which the cantilever 5 oscillates, the sample is scanned in the X and Y directions and the cantilever 5 is scanned in the Z direction to keep amplitude constant. The feedback signal of the driving-laser control unit 13 is supplied to the computer 15. The computer 15 generates a three-dimensional image of the sample surface on the basis of the control data of the XY scanning and the feedback signal inputted. The three-dimensional image generated is displayed on the monitor 41.

Figure 3:
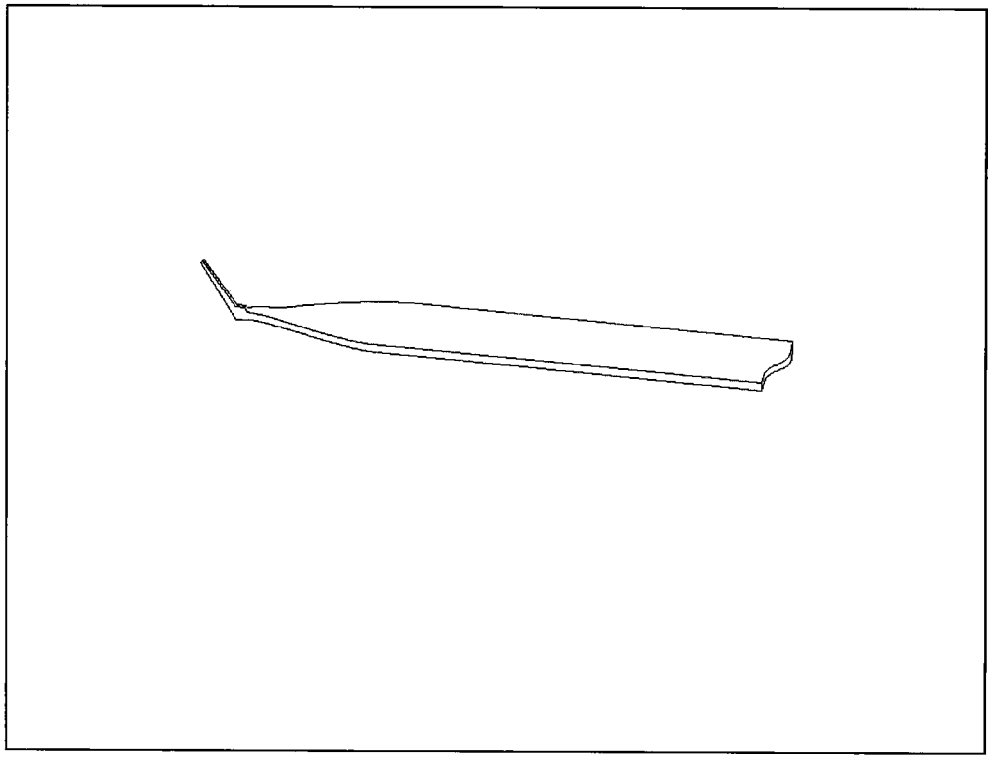
FIG. 3 is a diagram showing an example of the cantilever.

FIG. 3 shows the cantilever 5 in a specific example of this embodiment and consists of an electronic microscope image (with magnification of 15000) of the cantilever. In this example, the cantilever 5 generally has a substantially uniform cross section. A sectional shape in a width direction is rectangular. A tip of the lever has a taper shape. Length of the lever is about 8 μm, width thereof is about 2 μm, and thickness (including the gold coat) thereof is about 0.1 μm. The gold coat is applied on the opposite side of the probe.

In the case of this example, a resonance frequency of the cantilever is about 800 kHz in the liquid and is about 2.2 MHz in the atmosphere. The resonance frequency is extremely high. It is possible to perform the Z scanning for the cantilever 5 in a domain lower than this resonance frequency. Therefore, it is possible to substantially increase scanning speed compared with the conventional scanner of a piezoelectric element (about 1 kHz). As indicated by this example, since the piezoelectric element is large, a resonance frequency thereof is low and high-speed driving thereof is difficult. On the other hand, since the cantilever is small, a resonance frequency is high and high-speed driving is easy.

In a specific example of this embodiment, a wavelength of a driving laser beam is 405 nm. It is possible to modulate intensity of a laser in a range of 0 to 20 mW. It is possible to use the laser at a maximum frequency of 50 MHz. In this case, sensitivity was 5 to 8 nmpp/mW. Maximum movable displacement was 100 to 160 nmpp (at the time when modulation intensity was 20 mW). These values were obtained in a frequency lower than the resonance frequency. Therefore, it is possible to obtain sufficient sensitivity and displacement for the AFM.

In this embodiment, an actuation function is easily obtained by irradiating light on a usual cantilever. This means that complicated work observed in the conventional cantilever of the self-actuation type is unnecessary. It is possible to prevent an increase in hardness observed in the conventional cantilever of the self-actuation type (in the cantilever according to this embodiment, a spring constant is about 150 pN/nm). Moreover, in the cantilever of the self-actuation type, assurance of insulation is also a problem. However, according to this embodiment, the problem of insulation is easily prevented as well.

<Thermal Response Compensation>

Figure 4:
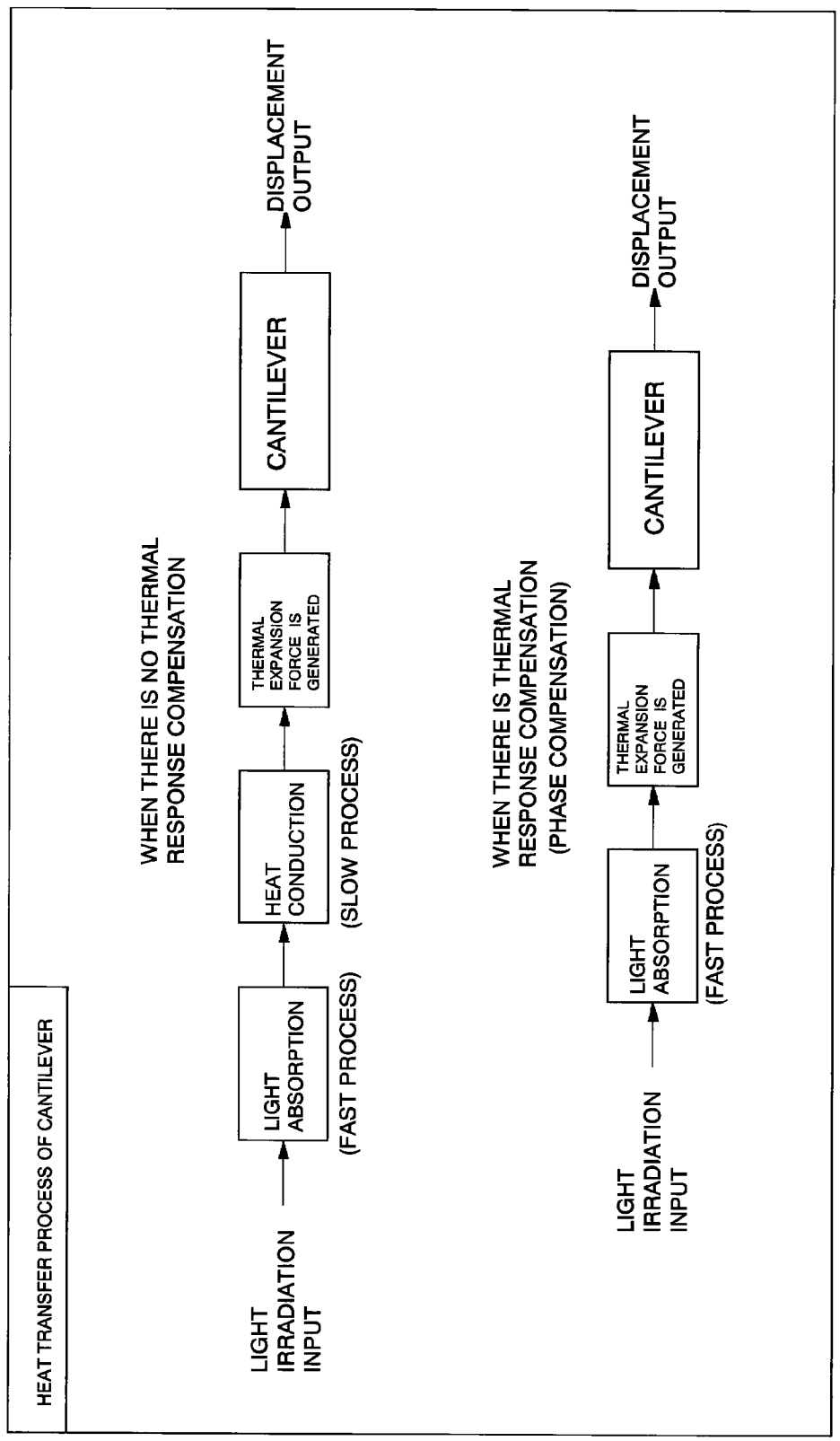
FIG. 4 is a diagram showing a process from light irradiation to lever displacement.

The thermal-response compensating circuit 35 will be explained in detail. FIG. 4 shows a process from input of light irradiation to output of cantilever displacement. A process on the upper section in FIG. 4 is a process in the case in which thermal response compensation is not performed. Light is absorbed by the cantilever, heat conduction occurs, thermal expansion force is generated, the cantilever is deformed, and displacement occurs. In this series of process, light absorption is fast (equal to or shorter than nanosecond order). However, the heat conduction is slow. Therefore, a response of lever displacement to light irradiation is delayed because of the heat conduction. This delay in the response is disadvantageous for an increase in speed of the Z scanning. Thus, in this embodiment, thermal response compensation is performed. More specifically, the principle of phase compensation is introduced to realize the thermal response compensation. Consequently, as shown at the lower section in FIG. 4, the process of the heat conduction is not performed in appearance and response speed is increased.

Figure 5:
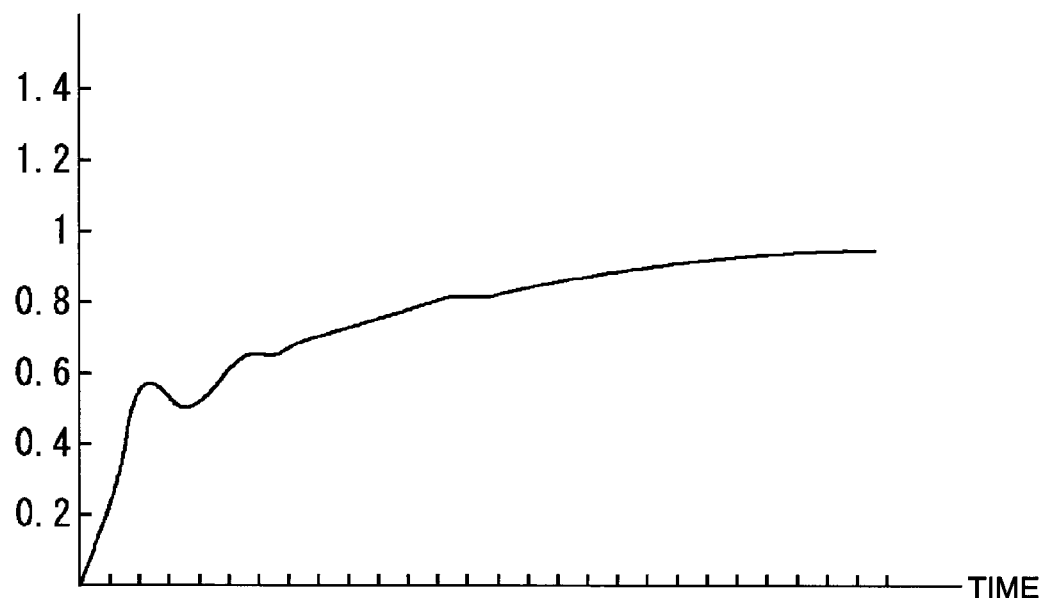
FIG. 5 is a graph showing a thermal response characteristic of the cantilever.

FIG. 5 shows a relation between time and displacement when a laser beam is irradiated on the cantilever (the thermal response compensation is not performed). An example in FIG. 5 indicates a measurement result when the cantilever of the specific example described above is used. As shown in FIG. 5, the displacement of the cantilever gradually increases according to the elapse of time and a thermal response is delayed. This delay is caused by heat conduction.

The thermal response in FIG. 5 behaves like a low-pass filter of an electronic circuit. In other words, a delay phenomenon of the thermal response is similar to a delay of the low-pass filter. In such a case, in the electronic circuit, phase compensation is suitably applied. In this embodiment, with attention directed to this point, as explained below, the principle of phase compensation observed in the electronic circuit is introduced into the heat conduction process. The thermal response compensation for the cantilever is realized by such a new method.

In the example in FIG. 5, it is possible to consider that the heat conduction process consists of two processes. It is possible to regard the heat conduction process as two parallel low-pass filters. In this case, a transfer function G(s) is represented as a sum of the two low-pass filters as indicated by the following equation.

$$G(s) = \frac{a}{1+s/\omega_1} + \frac{b}{1+s/\omega_2} \quad (a+b=1) \qquad \text{[Numeral 3]}$$
$$(LPF) \quad\quad (LPF)$$

The transfer function G(s) is further transformed as follows.

$$G(s) = \frac{1}{1+s/\omega_1} * \frac{1}{1+s/\omega_2} * \left[1 + \left(\frac{a}{\omega_2} + \frac{b}{\omega_1}\right)s\right] \qquad \text{[Numeral 4]}$$

$$\frac{1}{\omega_3} \equiv \frac{a}{\omega_2} + \frac{b}{\omega_1} とすると$$

$$G(s) = \frac{1}{1+s/\omega_1} * \frac{1}{1+s/\omega_2} * \left(1 + \frac{s}{\omega_3}\right)$$
$$(LPF) \quad\quad (LPF) \quad\quad (1+D)$$

The equation after transformation is a product of multiplication of the two low-pass filters and a (1+differential) term. This means that the transfer function G(s) is equivalent to series two kinds of low-pass filters and one (1+differential) term. In the phase compensation, an inverse transfer function of the transfer function G(s) is used. The inverse function is a product of two kinds of (1+differential) terms and one low-pass filter. The thermal-response compensating circuit 35 in FIG. 1 includes a circuit equivalent to the inverse transmission function.

Figure 6:
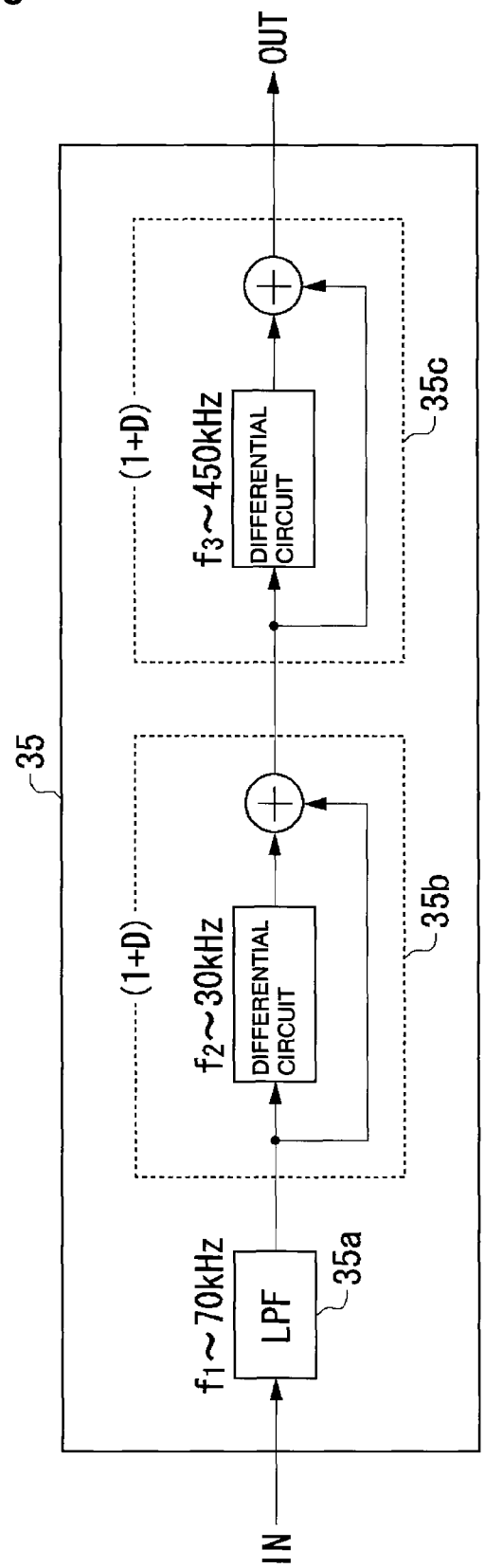
FIG. 6 is a diagram showing a structure of a thermal-response compensating circuit.

FIG. 6 shows a structure of the thermal-response compensating circuit 35. As shown in the figure, the thermal-response compensating circuit 35 includes one low-pass filter 35a and two (1+differential) circuits 35b and 35c, which are arranged in series. Parameters of the circuits 35a, 35b, and 35c are set on the basis of the measurement result of the thermal response of the cantilever 5 (FIG. 5). More specifically, a heat transfer function equivalent to an actual thermal response is determined from the measurement result and an inverse transfer function of the heat transfer function (a function that is an inverse of the heat transfer function) is determined. A circuit is constituted to correspond to the inverse transfer function.

An irradiation control signal (a signal obtained by combining feedback signals) of a driving laser beam is inputted to the thermal-response compensating circuit 35 as shown in FIG. 1 and supplied to the driving laser unit 11. Consequently, the phase compensation indicated by the principle described above is suitably realized.

Figure 7:
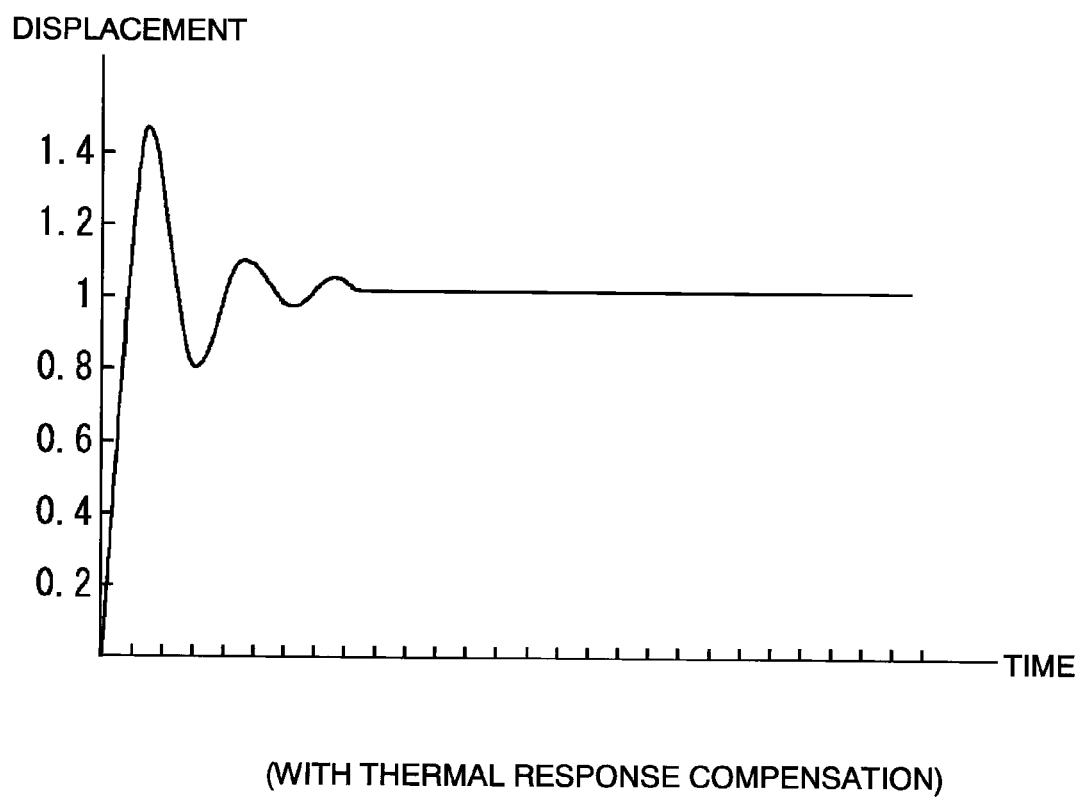
FIG. 7 is a graph showing effects of thermal response compensation.

FIG. 7 shows effects of the phase compensation. Like FIG. 4, FIG. 7 shows a change in lever displacement when a laser beam is irradiated. As a result of performing the phase compensation, displacement of the lever reaches a fixed value in a short time and the response speed is increased.

Figure 8:
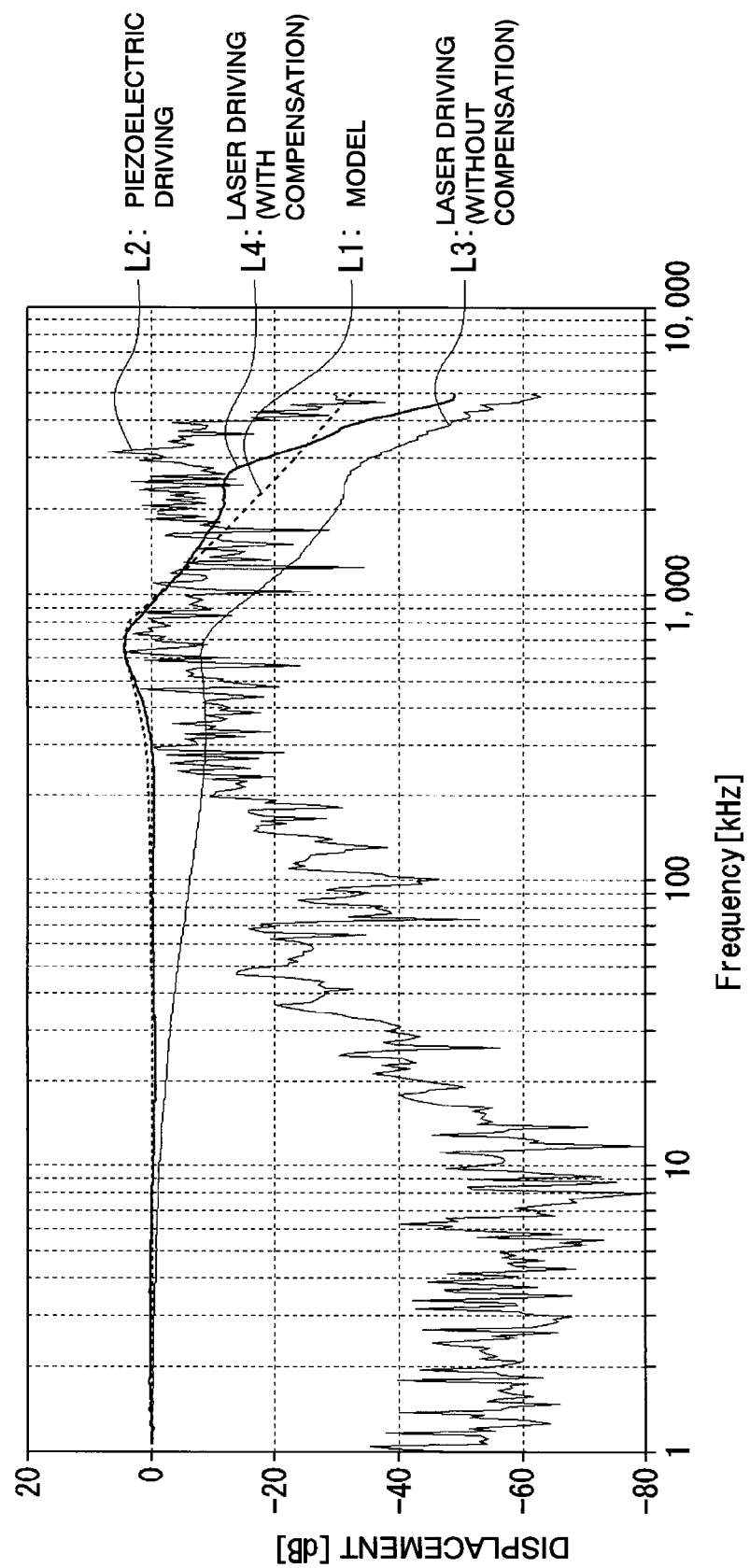
FIG. 8 is a graph showing the effects of the thermal response compensation.

FIG. 8 is another graph showing the effects of the phase compensation. FIG. 8 shows an oscillation characteristic in the water of the cantilever. The abscissa indicates a frequency and the ordinate indicates amplitude. Line L1 (a dotted line) in the figure indicates a characteristic of a model in calculation. Line L2 indicates a characteristic when piezoelectric driving is performed. Line L3 indicates a characteristic when the lever is driven by a laser beam without the phase compensation. Line L4 indicates a characteristic of laser driving when the phase compensation is performed.

As shown in the figure, by applying the phase compensation, a characteristic of the cantilever substantially coincides with the model in calculation. This means that an element that connects light irradiation, which is an input, and displacement, which is an output, is only the mechanical characteristics of the cantilever itself. Therefore, response speed of lever displacement to light irradiation is increased.

As shown in FIG. 8, in this embodiment, the cantilever in the water is driven by a laser beam. A resonance frequency is extremely high at about 800 kHz. It is possible to perform the Z scanning in a domain lower than the resonance frequency. This means that it is possible to substantially increase scanning speed of the Z scanning compared with that in the past.

Figure 9:
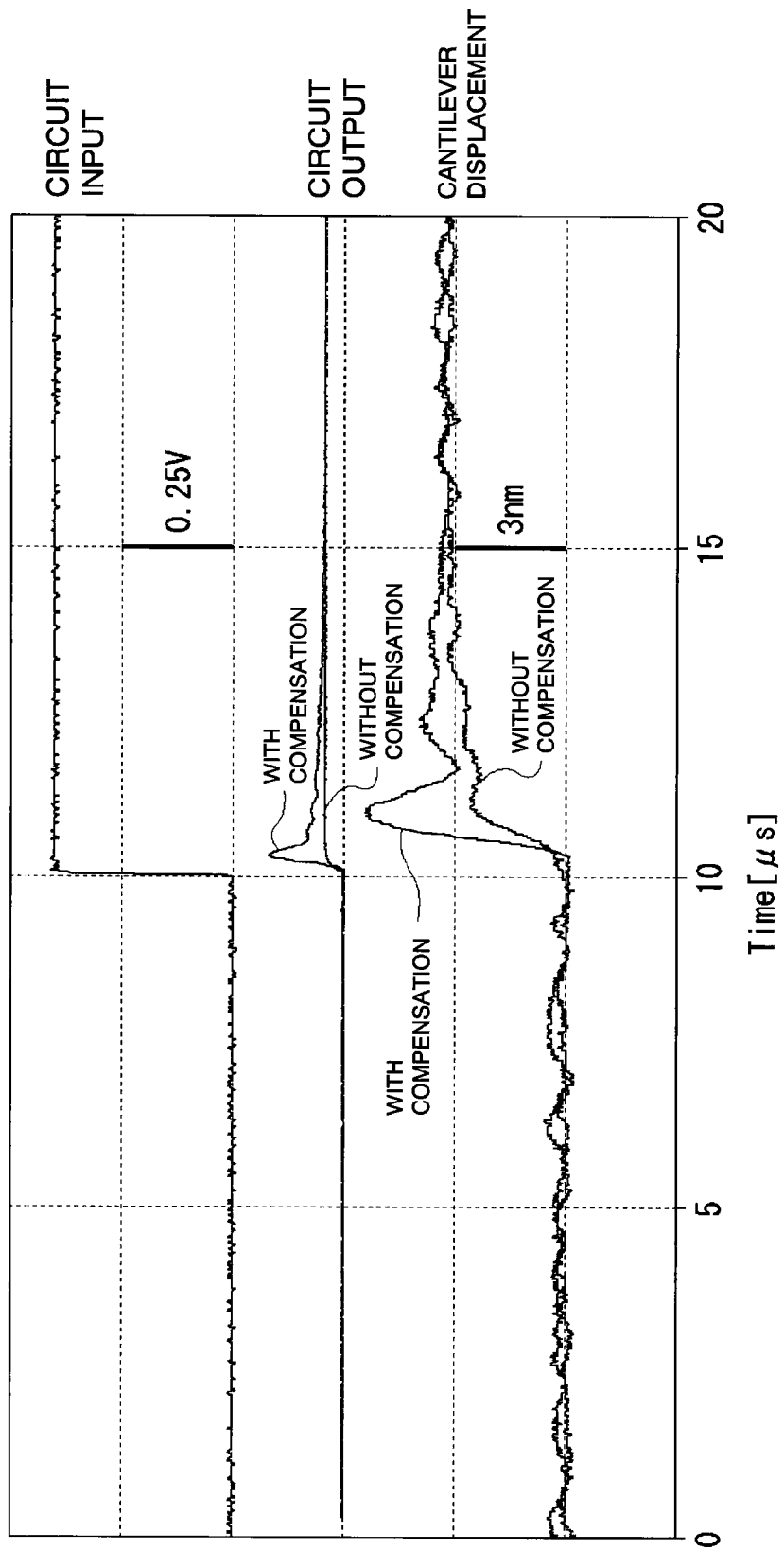
FIG. 9 is a graph showing the effects of the thermal response compensation.
Figure 10:
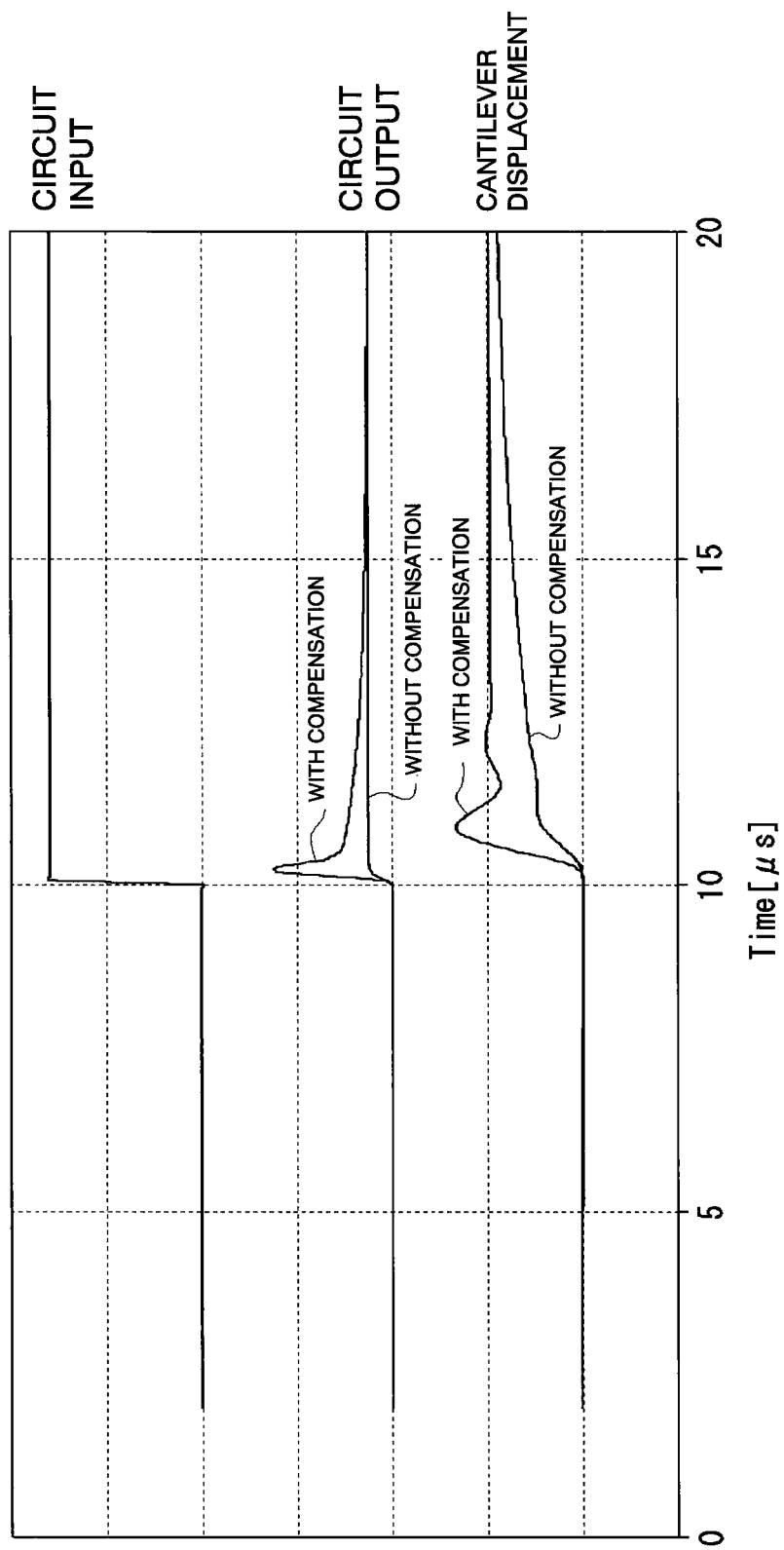
FIG. 10 is a graph showing the effects of the thermal response compensation.
Figure 11:
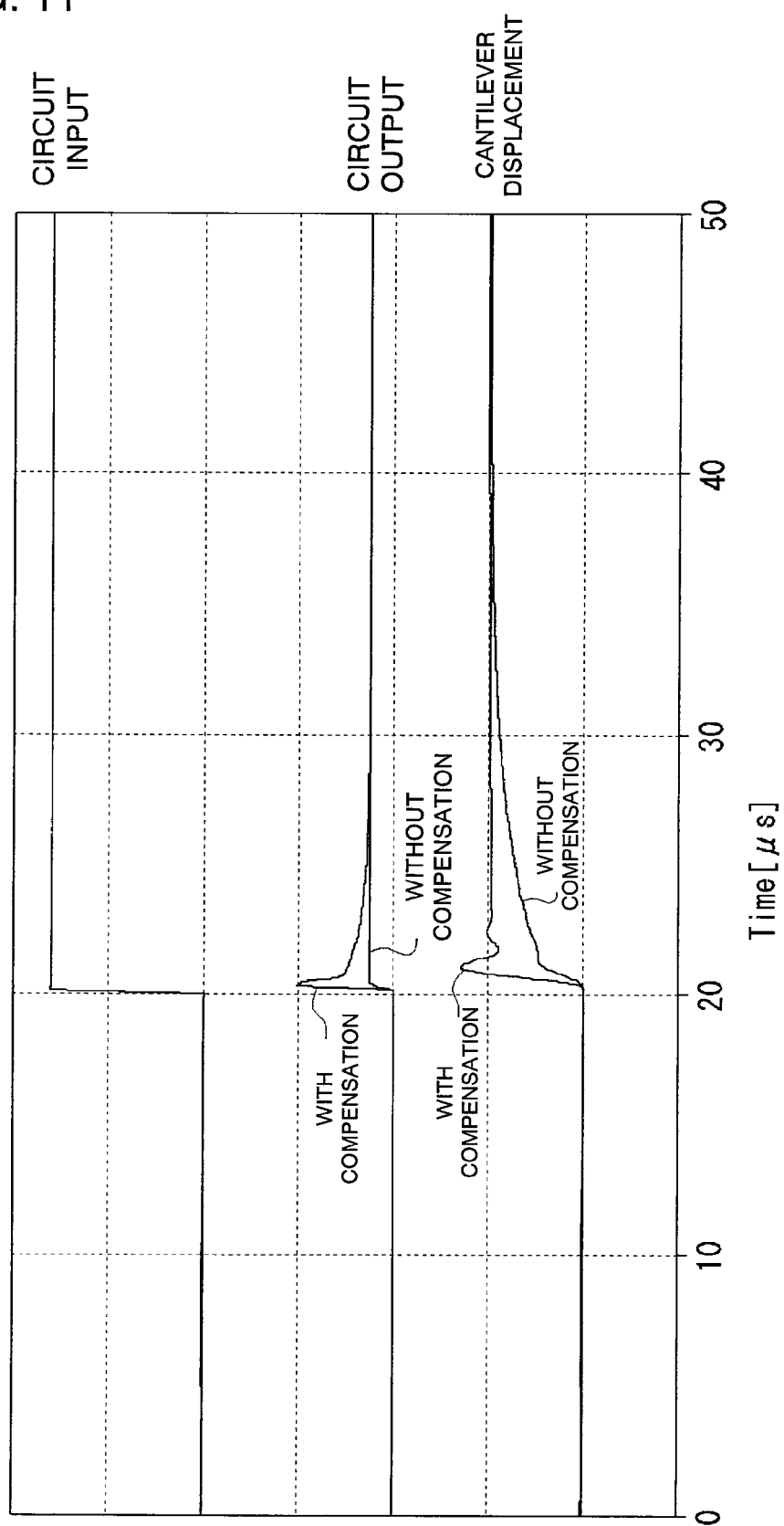
FIG. 11 is a graph showing the effects of the thermal response compensation.

FIGS. 9 to 11 are other diagrams showing the effects of the phase compensation. FIGS. 9 to 11 show a rectangular wave response of cantilever displacement. FIG. 9 is measurement data and FIGS. 10 and 11 are simulation results. The upper section in each of the figures indicates an input to the thermal-response compensating circuit 35, the middle section indicates an output of the circuit 35, and the lower section indicates displacement of the cantilever. In FIGS. 9 and 10, step input to the thermal-response compensating circuit 35 is performed at the time of 10 μs to change laser intensity in a rectangular wave manner. In FIG. 11, laser intensity is changed at the time of 20 μs in the same manner. In these figures, an increase in response speed by the phase compensation appears.

The preferred embodiment of the invention has been explained. In this embodiment, the driving-laser control unit 13 is a form of the light-irradiation control unit. In particular, the feedback circuit 33 functions as the Z-scanning control unit. The thermal-response compensating circuit 35 is a form of the thermal-response compensating unit.

According to this embodiment, light is irradiated on the cantilever and the cantilever is displaced by thermal expansion deformation. Scanning in the Z direction is performed utilizing this displacement. Therefore, it is possible to increase an operation frequency of the constitution for the Z scanning and increase scanning speed. It is also possible to prevent the cantilever from being formed hard as observed in the conventional cantilever of the self-actuation type.

The cantilever has a plurality of layers with different coefficients of thermal expansion. The cantilever is deformed and deflected or bent in the Z direction according to a difference of the coefficients of thermal expansion of the plurality of layers. Consequently, displacement in the Z direction is obtained.

More specifically, the cantilever has a structure in which gold is coated on silicon nitride. Light is irradiated on this gold coating. Gold absorbs light in a visible light domain and has a high coefficient of thermal expansion. Therefore, displacement of the cantilever is suitably obtained by using the gold coating.

Conventionally, in order to reflect light of the sensor of the optical lever type, the gold coating is applied to the cantilever. The invention is also advantageous in that it is possible to utilize the gold coating.

The thermal-response compensating unit is provided in this embodiment. More specifically, with attention directed to the fact that a thermal response shows a behavior of a low-pass filter, the phase compensation is performed. The thermal-response compensating unit has the constitution equivalent to an inverse transfer function of a heat transfer function of the cantilever. Consequently, it is possible to perform the phase compensation. It is possible to eliminate the slow process of a heat conduction process (or substantially reduce the process) in appearance according to the thermal response compensation.

Therefore, an element that connects the light irradiation, which is an input, and the displacement, which is an output, has characteristics close to the mechanical characteristics of the cantilever. In other words, it is possible to set response speed of deformation due to thermal expansion the same as response speed of deformation according to the original mechanical characteristics of the lever structure. As a result, response speed of deformation by thermal expansion is high and it is possible to perform high-speed scanning and high-speed imaging by the high-speed scanning.

<Lever Oscillation Control>

Figure 12:
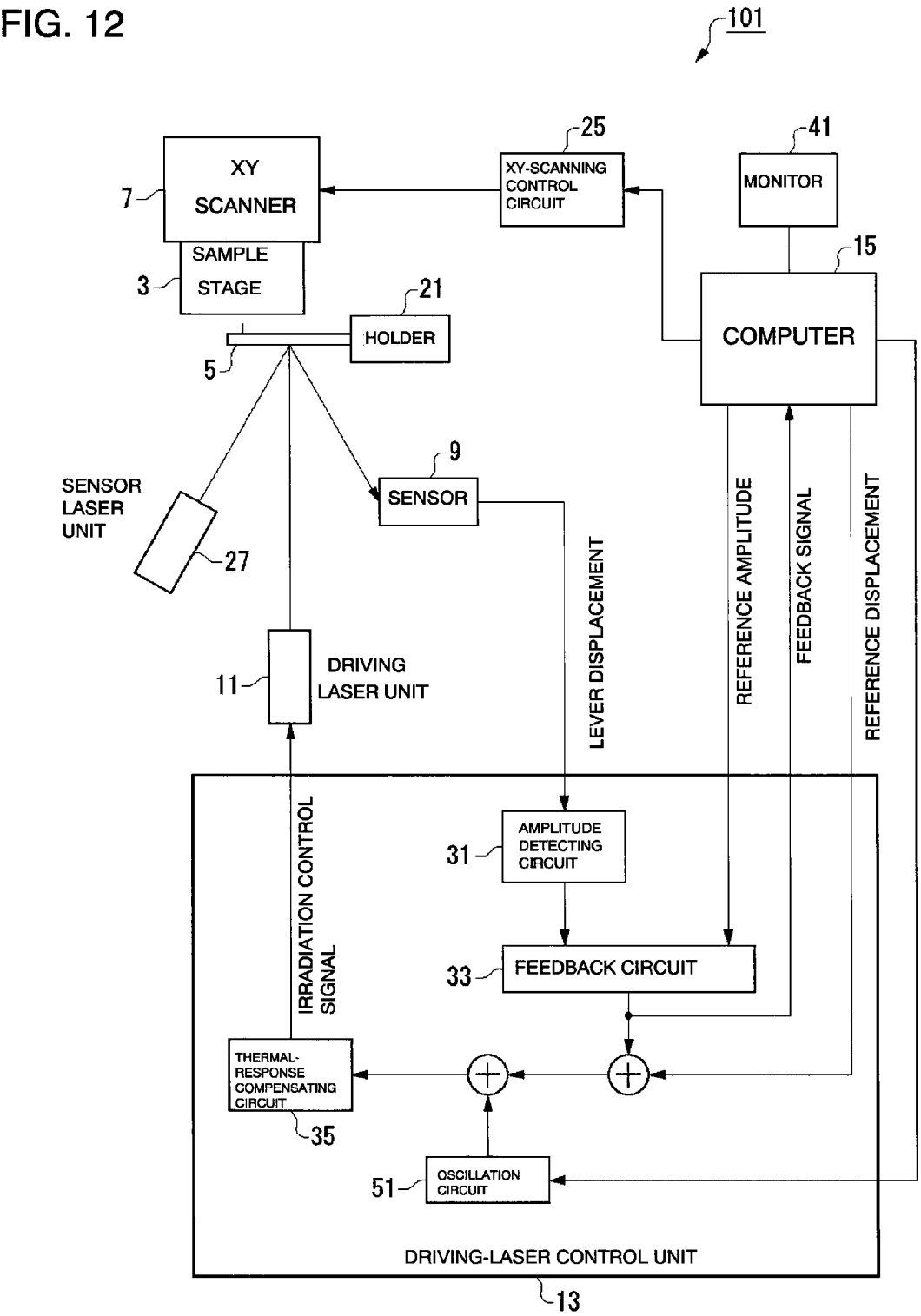
FIG. 12 is a diagram showing a structure of an AFM according to another embodiment of the invention.

FIG. 12 shows another embodiment of the invention. In the embodiment described above, the Z scanning is performed by light irradiation. In this embodiment, in addition to the Z scanning, excitation of a cantilever is performed by light irradiation. Explanations of the items identical with those in the embodiment described above are omitted below.

In an AFM 101 in FIG. 12, the oscillation circuit of the holder 21 is deleted. Instead of the oscillation circuit, the driving-laser control unit 13 includes an oscillation circuit 51. The oscillation circuit 51 is controlled by the computer 15 to generate an excitation signal. This excitation signal is a signal having an oscillation waveform of a resonance frequency of the cantilever. The excitation signal is added to an irradiation control signal of the driving-laser control unit 13. A signal of an AC component is added to an original irradiation control signal of a DC component.

Such an irradiation control signal is supplied to the driving laser unit 11 through the thermal-response compensating circuit 35. Therefore, laser beam intensity is modulated at the same frequency as the resonance frequency of the cantilever 5. At the same time, a DC component of the laser beam intensity takes a value corresponding to the reference displacement of the cantilever 5 and is adjusted by feedback control. Displacement of the cantilever 5 also changes according to the laser beam intensity. Consequently, while oscillating the cantilever 5 at the resonance frequency using light irradiation, it is possible to feedback-control average displacement (the center of displacement of the oscillating cantilever). In other words, it is possible to perform excitation and the Z scanning of the cantilever 5 using one laser unit.

The AFM according to the embodiment shown in FIG. 12 has been explained. In this embodiment, the oscillation circuit 51 functions as the oscillation control unit of the invention. According to this embodiment, both the oscillation and the Z scanning of the cantilever are performed by light irradiation. This makes it possible to perform high-speed scanning. Since mechanical excitation of the cantilever is unnecessary, it is possible to simplify a structure of the AFM.

<Q-Value Control>

Figure 13:
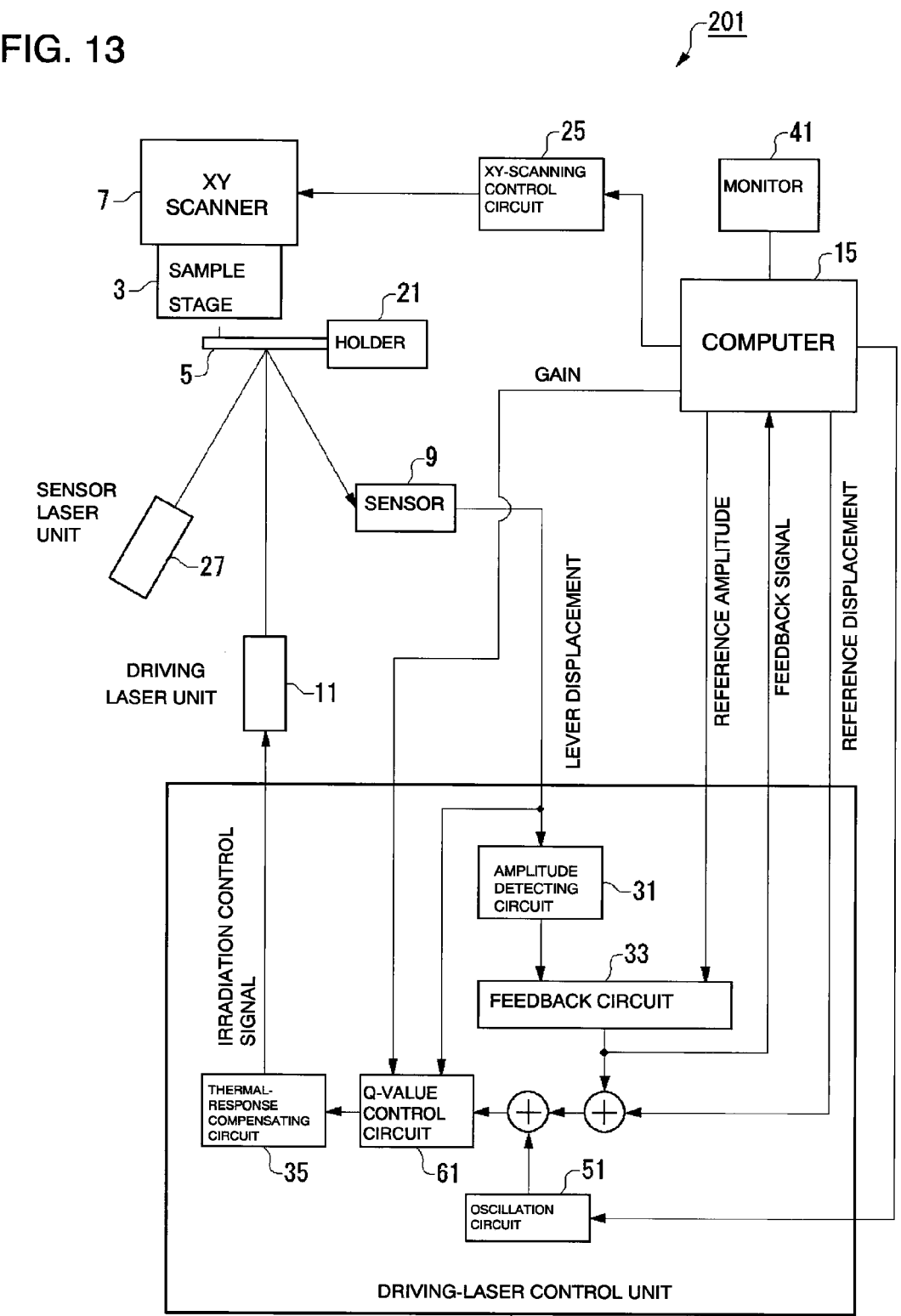
FIG. 13 is a diagram showing a structure of an AFM according to still another embodiment of the invention.

FIG. 13 shows still another embodiment of the invention. In FIG. 13, a constitution for the Q-value control is added. Explanations of items identical with those in the embodiments described above are omitted below.

A Q value (a quality factor) is a dimensionless number representing a state of oscillation and a parameter representing sharpness of a resonance spectrum (a relation of displacement with respect to a frequency of an oscillation) The Q value is represented by $\omega 0/(\omega 2-\omega 1)$. $\omega 0$ indicates a resonance frequency at a resonance peak. $\omega 1$ and $\omega 2$ indicate frequencies at which oscillation energy takes half values on the left and the right sides of the resonance peak.

An increase in response speed of the cantilever contributes to an increase in scanning speed of the AFM. Response speed of all mechanical devices including the cantilever is described as a formula $\pi f/Q$ using a resonance frequency (f) of resonance of the devices and the Q value. It is seen that, to increase the response speed, it is effective to increase the resonance frequency or decrease the Q value. However, the resonance frequency and the Q value are values that depend on a shape of the cantilever and a measurement environment. It is not easy to manufacture a cantilever, a resonance frequency and a Q value of which substantially change.

Among these characteristics, concerning the Q value, there is known a method of effectively controlling a Q value of a resonating member. An equation of motion of the resonating member is written as follows.

[Numeral 5]

$$m\ddot{z}+\gamma\dot{z}+kz=F(t) \tag{1}$$

In the equation, "m" indicates a mass, "γ" indicates a viscous coefficient, "k" indicates a spring constant, and "F(t)" indicates an external force. A general solution is represented as follows.

[Numeral 6]

$$Z(t)=Zoe^{i(wt+\theta)} \tag{2}$$

Here, when a differential value of a signal (a displacement signal) of the general solution is multiplied by a certain amplification factor (a) and the differential value multiplied by the amplification factor (a) is added to (or subtracted from) the external force, an equation of motion is written as follows.
[Numeral 7]

$$m\ddot{z}+\gamma\dot{z}+kz=F(t)\mp\alpha\dot{z} \quad (3)$$

This equation is further transformed as follows. "eff" means an effective value.

[Numeral 8]

$$m\ddot{z}+\gamma_{eff}\dot{z}+kz=F(t) \quad (4)$$

$$\gamma_{eff}=\gamma\pm\alpha \quad (5)$$

$$Q_{eff}=\frac{m\omega}{\gamma_{eff}} \quad (6)$$

It is seen from the calculation that it is possible to change the effective value of the Q value. It is assumed that it is attempted to apply such Q-value control to the cantilever. The Q-value control in this case is control for oscillating the cantilever with energy of a driver, detecting displacement of the cantilever, and adding an external force corresponding to the displacement.

However, in the conventional AFM, the oscillator is constituted by the piezoelectric element. In a driving method in which the piezoelectric element is used, resonating members other than the cantilever also cause oscillation. Therefore, it is impossible to perform the calculation for the Q-value control and the Q-value control is difficult (the difficulty of the Q-value control of the piezoelectric element is also seen from a peak forest in the oscillation characteristic of the piezoelectric element shown in FIG. 8).

Thus, in order to perform the calculation for the Q-value control, it is desired to directly drive only the cantilever using a structure different from the conventional piezoelectric element. If it is possible to directly drive the cantilever, it can be said that the Q-value control is easy. Such a request is satisfied in the AFM according to this embodiment. The AFM according to this embodiment directly drives the cantilever using a driving laser beam. Moreover, since the thermal-response compensating circuit is inserted, a delay in a thermal response is compensated. Since the slow process of heat conduction is eliminated in appearance, the original mechanical characteristics of the cantilever remain. In other words, it can be considered that an external force is directly applied to the cantilever (not through heat conduction). The AFM according to this embodiment is constituted to perform the Q-value control as described below utilizing this effect.

Referring to FIG. 13, in an AFM 201 according to this embodiment, a Q-value control circuit 61 is provided in the driving-laser control unit 13. A signal of displacement of the cantilever 5 is inputted to the Q-value control circuit 61 from the sensor 9. The Q-value control circuit 61 processes the signal of displacement of the cantilever 5 to generate a Q-value control signal. The Q-value control signal is added to an irradiation control signal and inputted to the thermal-response compensating circuit 35.

Figure 14:
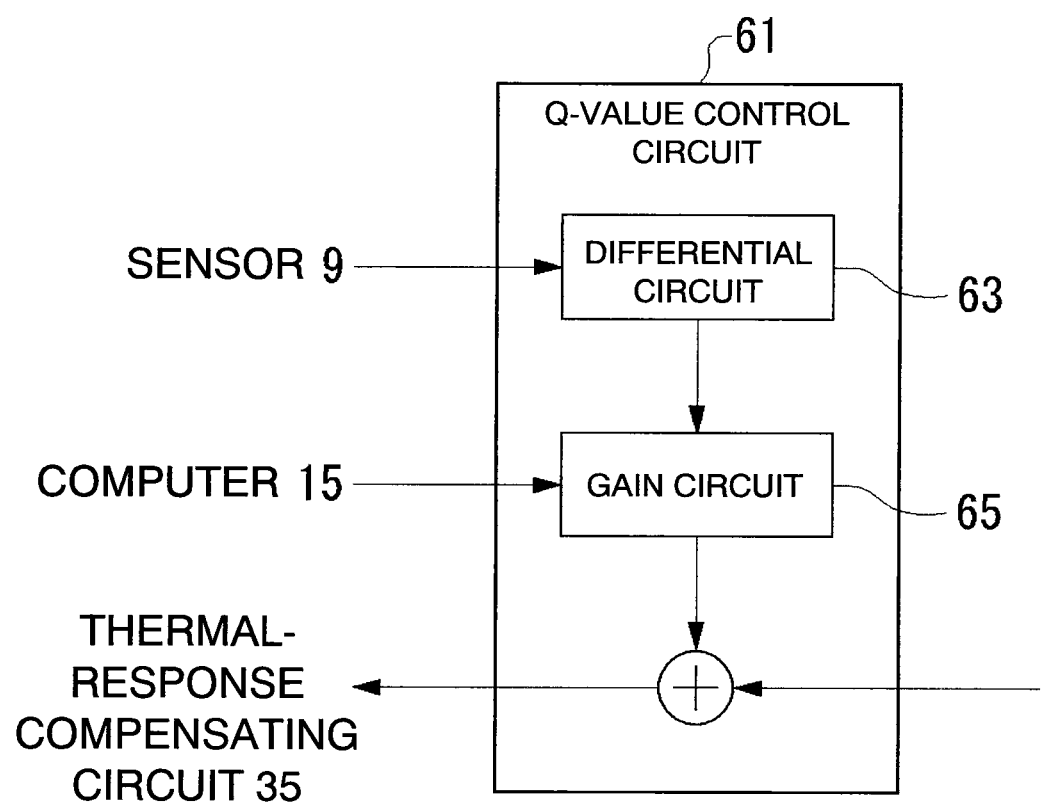
FIG. 14 is a diagram showing a structure of a Q-value control circuit.

FIG. 14 shows a structure of the Q-value control circuit 61. The Q-value control circuit 61 includes a differential circuit (a differential amplifier) 63 and a gain circuit (a gain amplifier) 65. Displacement of the cantilever 5 is differentiated in the differential circuit 63. A gain is given to a differential value in the gain circuit 65. A signal generated in this way is added to the irradiation control signal as a Q-value control signal in an adder 67. Therefore, the Q-value control is reflected on laser beam intensity of the driving laser unit 11.

The Q-value control is also reflected on force generated by thermal expansion in the cantilever 5. In this way, the Q-value control for the cantilever 5 is realized.

As shown in FIG. 13, the Q-value control circuit 61 is controlled by the computer 15. The computer 15 controls a value of a coefficient (a gain) in the Q-value control circuit 61.

Effects of the Q-value control in the cantilever will be explained. In the structure in FIG. 14, when again is positive, as explained in the principle of the Q-value control, an effective value of the viscous coefficient (γ) is small and the Q value is large. When the gain is negative, conversely, the Q value is small.

When the Q value is set small (low), the response speed is improved and it is possible to increase speed of the AFM. Since the control is fast, there is also an advantage that damage to a sample is reduced. However, sensitivity to an interaction between the cantilever probe and the sample decreases.

On the other hand, when the Q value is set large (high), the response speed falls. However, sensitivity to an interaction between the probe and the sample increases and sensitivity of detection is improved. Therefor, it is possible to increase spatial resolution of the AFM.

Figure 15:
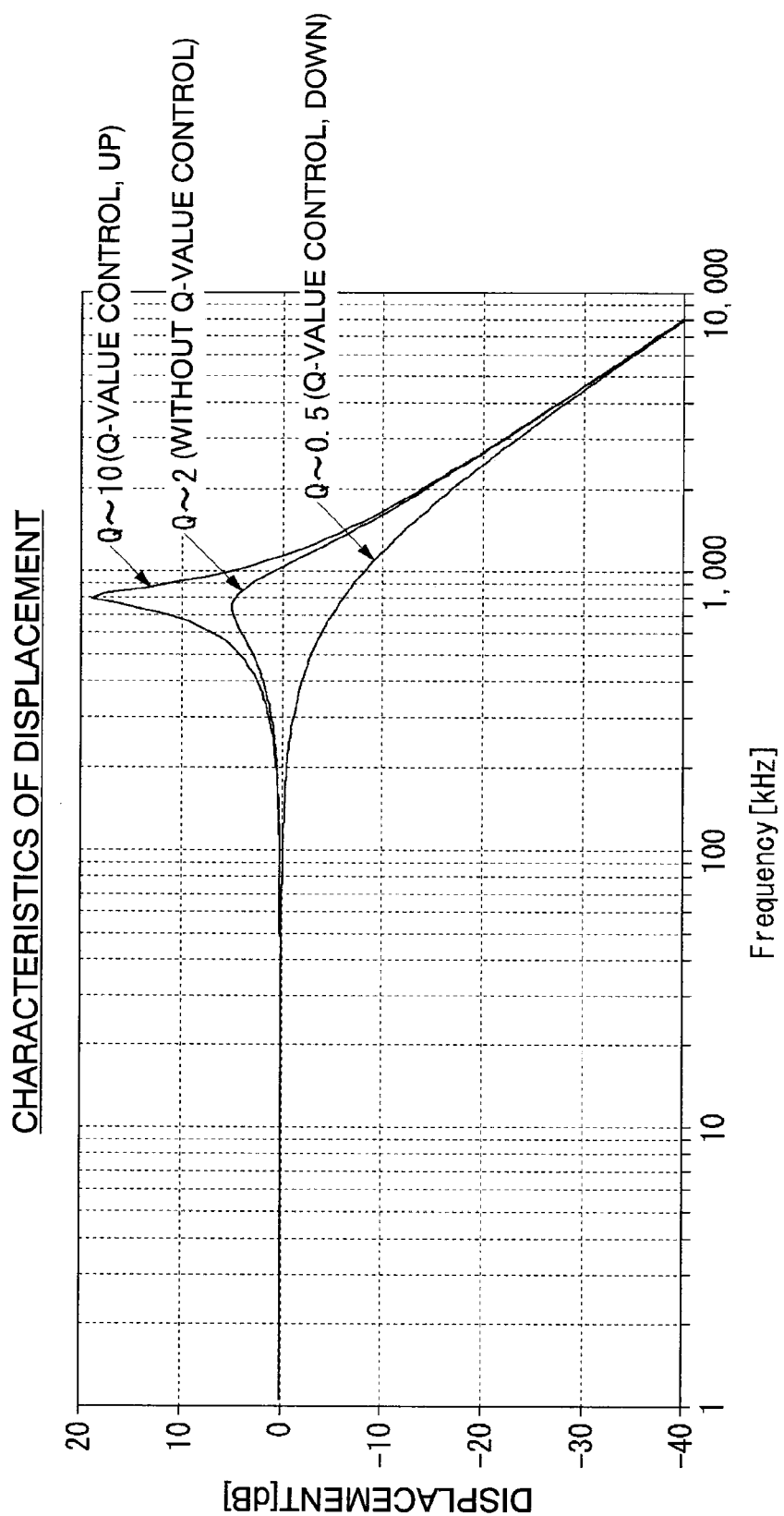
FIG. 15 is a graph showing effects of Q-value control.
Figure 16:
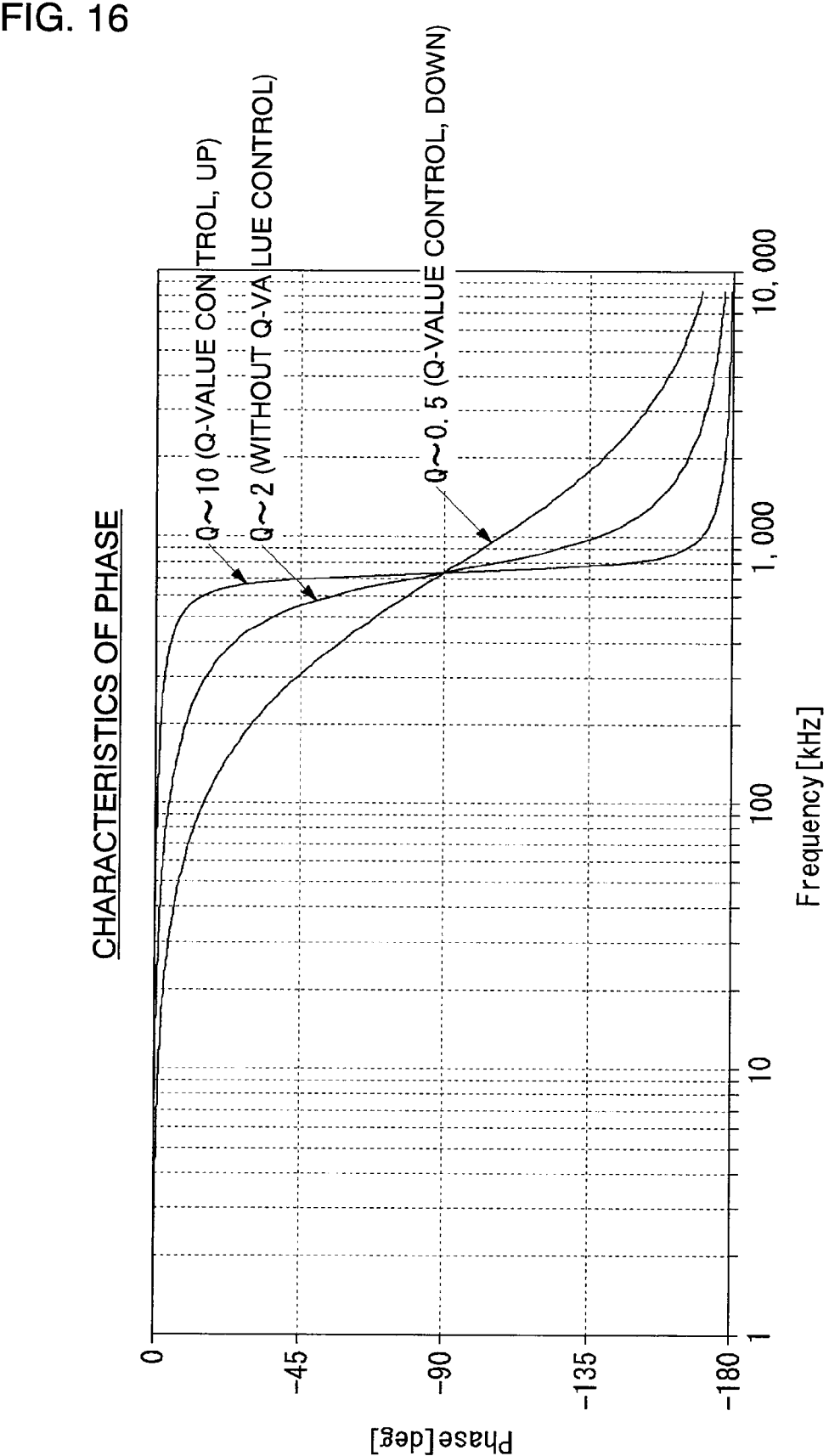
FIG. 16 is a graph showing the effects of the Q-value control.

FIGS. 15 to 18 show simulation results indicating the effects of the Q-value control. FIGS. 15 and 16 are graphs of simulation results of frequency characteristics. FIG. 15 is a graph of displacement of output amplitude with respect to input amplitude. FIG. 16 is a graph of a phase. A Q value is about 2 when the Q-value control is not performed. A resonance frequency is 804 kHz. FIGS. 15 and 16 show three frequency characteristics of Q values of 0.5, 2, and 10. As shown in the figures, at the Q value of 10, amplitude of the resonance frequency increases and the phase steeply changes. Therefore, it is seen that, when the Q value is set larger, sensitivity increases.

Figure 17:
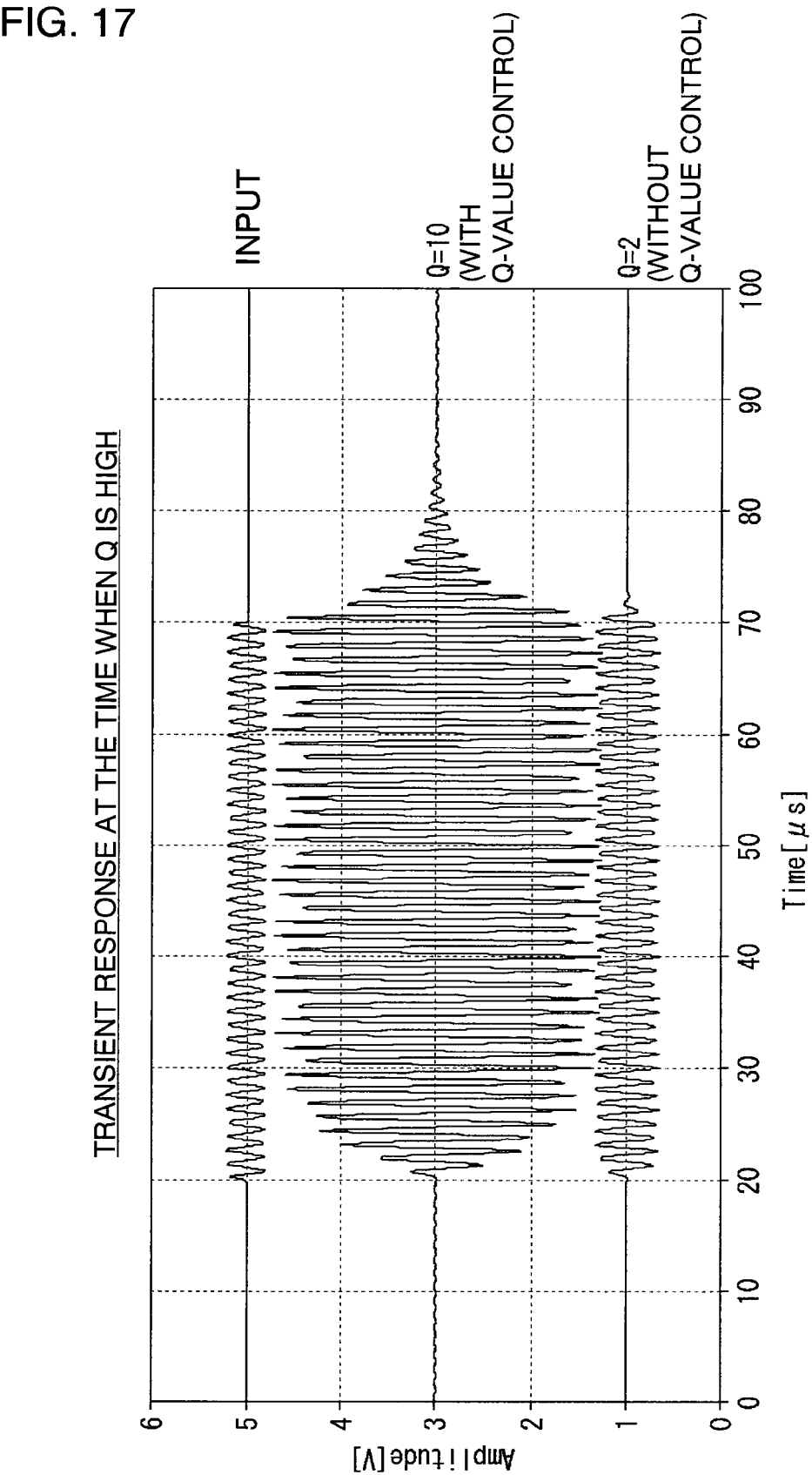
FIG. 17 is a graph showing the effects of the Q-value control.
Figure 18:
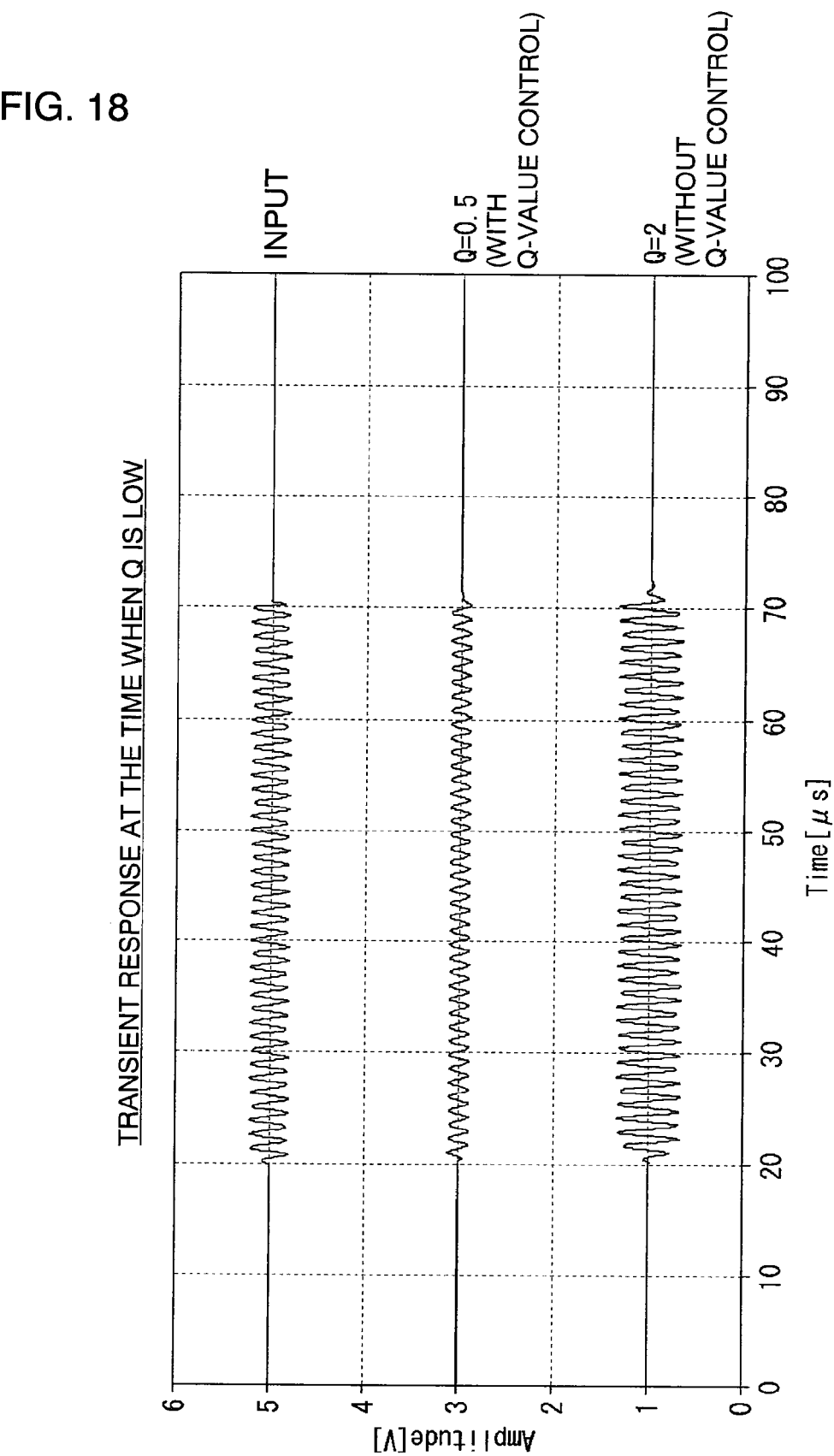
FIG. 18 is a graph showing the effects of the Q-value control.

FIGS. 17 and 18 show transient response characteristics. FIG. 17 is a graphs of an input signal (the upper section), a characteristic when the Q value is set large (the middle section, Q value=10), and a characteristic when the Q-value control is not performed (the lower section, Q value=2). FIG. 18 is a graph of an input signal (the upper section), a characteristic when the Q value is set small (the middle section, Q value=0.5), and a characteristic when the Q-value control is not performed (the lower section, Q value=2). From a point of 20 μs, a signal of a frequency 804 kHz is inputted. At a point of 70 μs, the input of the signal is stopped. As shown in the figures, when the Q value increases, a response is slow. On the other hand, when the Q value decreases, a response is fast.

The embodiment for performing the Q-value control has been explained. In this embodiment, the Q-value control circuit 61 corresponds to the Q-value control unit of the invention.

According to this embodiment, since the Q-value control unit is provided, it is possible to perform the Q-value control using light irradiation and adjust response speed and sensitivity.

In the constitution described above, the Q-value control is suitably combined with the thermal response compensation. Since the slow process of heat conduction is eliminated (or substantially reduced) in appearance by the thermal response compensation, the original mechanical characteristics of the cantilever remain. As a result, it is possible to realize an effect similar to the effect in which light irradiation directly applies force to the cantilever. The Q-value control similar to that where an external force is directly applied is performed to intensity of light irradiation, whereby the Q-value control is realized. Therefore, it is possible to easily perform the Q-value control.

According to this embodiment, it is possible to increase response speed and improve scanning speed by reducing the Q value. It is possible to increase displacement sensitivity and improve spatial resolution by increasing the Q value.

<Other Modifications>

Besides, the embodiments described above can be modified by those skilled in the art. For example, in the embodiments, the gold coat is applied to the light irradiation surface of the cantilever. However, a material other than gold may be applied. It is preferable to set a wavelength of a driving laser beam according to a material of the light irradiation surface. That is, a wavelength is set on the basis of a relation between a wavelength of a laser beam and a light absorption ability such that the light absorption ability is improved. It is preferable to set a material of the light irradiation surface taking into account reflectance of a sensor laser beam as well.

Concerning phase compensation in this embodiment, a structure of a thermal-response compensating circuit may be changed according to specifications of a cantilever and the like. In this embodiment, a heat transfer function of the cantilever is represented by two low-pass filters. The thermal-response compensating circuit is constituted to realize an inverse transfer function of this heat transfer function. However, the heat transfer function can be different depending on structures of the cantilever and the like. Thus, the structure of the thermal-response compensating circuit may be changed according to the heat transfer function. It is suitable to constitute the thermal-response compensating circuit to realize an inverse transfer function of an actual heat transfer function.

For example, a heat transfer function may be realized by one low-pass filter. An inverse transfer function (1+differential) of this heat transfer function may be realized by the thermal-response compensating circuit.

In the embodiments described above, light irradiation is utilized for the Z scanning. Alternatively, light irradiation is utilized for the Z scanning and excitation. The invention also includes a constitution in which light irradiation is used only for excitation. In this case, as in the embodiments, the Q-value control is suitably performed.

In the embodiments described above, the invention is applied to the AFM of the AC mode. However, the invention is not limited to this. The invention may be applied to an AFM of a contact mode. In this case, a cantilever does not have to oscillate. Z scanning is realized by light irradiation.

In this embodiment, a piezoelectric element for Z driving (scanning) is not provided. However, the piezoelectric element for Z driving may be additionally provided. In this respect, in this embodiment, the XYZ scanner of the conventional AFM may be provided as an XY scanner. In this case, a scanning function only in the XY direction may be used. Alternatively, a scanning function in the Z direction may be used together with laser beam irradiation. For example, the piezoelectric element may be used for moving the cantilever 5 to an appropriate position at an initial stage of operation.

The invention is applicable to devices other than the AFM. Other forms of the invention are a driving device, a driving method, and the like for a cantilever. These forms may be applied to devices other than the scanning probe microscope.

The preferred embodiments of the invention conceivable at the present point have been explained. It is understood that various modifications to the embodiments are possible. It is intended that the appended claims include all such modifications that are within the true spirit and scope of the invention.

INDUSTRIAL APPLICABILITY

The scanning probe microscope according to the invention can increase scanning speed.

The invention claimed is:

1. A scanning probe microscope comprising:
a cantilever;
a sensor that detects displacement of the cantilever;
a light irradiating unit that irradiates light on the cantilever to cause thermal expansion deformation; and
a light-irradiation control unit that controls intensity of the light of the light irradiating unit to change the displacement of the cantilever, wherein
the light-irradiation control unit performs feedback control for the cantilever by controlling the intensity of the light of the light irradiating unit on the basis of the displacement detected by the sensor,
wherein the light-irradiation control unit includes a thermal-response compensating unit that compensates for a delay in a thermal response of the cantilever to the irradiation of the light from the light irradiating unit.

2. The scanning probe microscope according to claim 1, wherein the cantilever has a plurality of layers with different coefficients of thermal expansion and is deformed and deflected in a Z direction according to a difference of the coefficients of thermal expansion of the plurality of layers.

3. The scanning probe microscope according to claim 2, wherein the cantilever has a structure in which gold is coated on silicon nitride, and light is irradiated on the gold coating.

4. The scanning probe microscope according to claim 1, wherein the thermal-response compensating unit has a constitution equivalent to an inverse transfer function of a heat transfer function of the cantilever.

5. The scanning probe microscope according to claim 1, wherein the light-irradiation control unit further includes an oscillation control unit that oscillates the cantilever by controlling the intensity of the light of the light irradiating unit.

6. The scanning probe microscope according to claim 5, wherein the light-irradiation control unit further includes a Q-value control unit that performs the Q-value control on the basis of the displacement detected by the sensor.

7. The scanning probe microscope according to claim 6, wherein the Q-value control unit has a constitution for obtaining a value that a gain is given to differential of the displacement detected by the sensor.

8. The scanning probe microscope according to claim 6, wherein the Q-value control unit is configured to allow for decreases in a Q value.

9. The scanning probe microscope according to claim 6, wherein the Q-value control unit is configured to allow for increases in a Q value.

10. A scanning probe microscope comprising:
a cantilever;
a light irradiating unit that irradiates light on the cantilever to cause thermal expansion deformation; and
a light-irradiation control unit that controls intensity of the light of the light irradiating unit to change displacement of the cantilever, wherein
the light-irradiation control unit includes an oscillation control unit that oscillates the cantilever by controlling intensity of the light of the light irradiating unit and a thermal-response compensating unit that compensates for a delay in a thermal response of the cantilever to the irradiation of the light from the light irradiating unit.

11. The scanning probe microscope according to claim 10, wherein the thermal-response compensating unit has a constitution equivalent to an inverse transfer function of a heat transfer function of the cantilever.

12. The scanning probe microscope according to claim 10, further comprising a sensor that detects displacement of the cantilever, wherein
the light-irradiation control unit further includes a Q-value control unit that performs the Q-value control on the basis of the displacement detected by the sensor.

13. The scanning probe microscope according to claim 12, wherein the Q-value control unit has a constitution for obtaining a value that a gain is given to differential of the displacement detected by the sensor.

14. The scanning probe microscope according to claim 12, wherein the Q-value control unit is configured to allow for decreases in a Q value.

15. The scanning probe microscope according to claim 12, wherein the Q-value control unit is configured to allow for increases in a Q value.

16. An observation method by a scanning probe microscope, comprising:
performing relative movement between a cantilever and a sample in X and Y directions;
irradiating light on the cantilever to cause thermal expansion deformation;
detecting displacement of the cantilever; and
performing feedback control for the cantilever by controlling intensity of the light on the basis of the displacement of the cantilever detected,
wherein a delay in a thermal response of the cantilever to the irradiation of the light is compensated by controlling the intensity of the light.

17. The observation method by a scanning probe microscope according to claim 16, wherein the cantilever is oscillated by controlling the intensity of the light.

18. The observation method by a scanning probe microscope according to claim 17, wherein a Q-value control based on the displacement of the cantilever detected is performed by controlling the intensity of the light.

19. An observation method by a scanning probe microscope, comprising:
performing relative movement between a cantilever and a sample in X and Y directions;
irradiating light on the cantilever to cause thermal expansion deformation;
oscillating the cantilever by controlling intensity of the light; and
compensating for a delay in a thermal response of the cantilever to the irradiation of the light by controlling intensity of the light.

20. The observation method by a scanning probe microscope according to claim 19, further comprising detecting displacement of the cantilever, wherein
Q-value control based on the displacement of the cantilever detected is performed by controlling the intensity of the light.

21. A cantilever driving device comprising:
a sensor that detects displacement of a cantilever;
a light irradiating unit that irradiates light on the cantilever to cause thermal expansion deformation; and
a light-irradiation control unit that controls intensity of the light of the light irradiating unit to change the displacement of the cantilever, wherein
the light-irradiation control unit performs feedback control for the cantilever by controlling the intensity of the light of the light irradiating unit on the basis of the displacement detected by the sensor,
wherein the light-irradiation control unit includes a thermal-response compensating unit that compensates for a delay in a thermal response of the cantilever to the irradiation of the light from the light irradiating unit.

22. The cantilever driving device according to claim 21, wherein the light-irradiation control unit further includes an oscillation control unit that oscillates the cantilever by controlling the intensity of the light of the light irradiating unit.

23. The cantilever driving device according to claim 22, wherein the light-irradiation control unit further includes a Q-value control unit that performs the Q-value control on the basis of the displacement detected by the sensor.

24. A cantilever driving device comprising:
a light irradiating unit that irradiates light on a cantilever to cause thermal expansion deformation; and
a light-irradiation control unit that controls intensity of the light of the light irradiating unit to change displacement of the cantilever, wherein
the light-irradiation control unit includes an oscillation control unit that oscillates the cantilever by controlling intensity of the light of the light irradiating unit and a thermal-response compensating unit that compensates for a delay in a thermal response of the cantilever to the irradiation of the light from the light irradiating unit.

25. The cantilever driving device according to claim 24, wherein the light-irradiation control unit further includes a Q-value control unit that performs the Q-value control on the basis of the displacement of the cantilever detected by the sensor.

* * * * *